US012744841B2

(12) United States Patent
Dasher et al.

(10) Patent No.: US 12,744,841 B2
(45) Date of Patent: Sep. 22, 2026

(54) SYSTEMS AND METHODS FOR AUTOMATED UPDATING OF CONTACT INFORMATION

(71) Applicant: Adeia Guides Inc., San Jose, CA (US)

(72) Inventors: Charles Dasher, Lawrenceville, GA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 209 days.

(21) Appl. No.: 18/791,006

(22) Filed: Jul. 31, 2024

(65) Prior Publication Data

US 2026/0039736 A1 Feb. 5, 2026

(51) Int. Cl.
*H04M 1/27453* (2020.01)
*G06F 3/0482* (2013.01)
*H04W 8/18* (2009.01)

(52) U.S. Cl.
CPC ....... *H04M 1/27453* (2020.01); *H04W 8/183* (2013.01); *G06F 3/0482* (2013.01)

(58) Field of Classification Search
None
See application file for complete search history.

(56) References Cited

U.S. PATENT DOCUMENTS 10,313,503 B2 6/2019 Acton et al.
2014/0287728 A1* 9/2014 Lim ........................ H04L 51/48 455/566
2015/0200904 A1* 7/2015 Khanna .................. H04L 51/52 455/466
2017/0139973 A1 5/2017 Huang

FOREIGN PATENT DOCUMENTS

KR 10-2023-0102769 A 7/2023

OTHER PUBLICATIONS

Core Telephony, Access information about a user's cellular service provider, such as its unique identifier and whether the carrier allows VoIP., available online at: <https://developer.apple.com/documentation/coretelephony>, retrieved on Aug. 13, 2024, 4 pages.

* cited by examiner

*Primary Examiner* — Nicholas J Lee
(74) *Attorney, Agent, or Firm* — HG Law LLP

(57) ABSTRACT

Systems and methods are provided herein for managing contact information in a manner personalized to the preferences of a user. Particularly, systems and related methods are disclosed for enabling continuity of communication between users when there is a change in the contact details of a user. Upon detecting a change in the contact details of a user, the system determines a recommendation of contacts to be notified of the change based on a communication history of the user, provides the user with options for updating contacts of the change, and updates the contact details of the user in cloud-based accounts. Following the updating process, messages specifying the original, outdated contact detail of the user are identified and subsequently rerouted or otherwise managed accordingly.

20 Claims, 18 Drawing Sheets

108a

| Contact | Last Communication Timestamp | Communications Exchanged Over Last Week/Month/Year | Overall Frequency Score | Contact Type | Primary Communication Platform |
|---|---|---|---|---|---|
| Contact 1 | 14:33:21 07/18/2024 | 322/3039/92376 | 10 | Favorite, Close Friend | iMessage |
| Contact 2 | 09:17:57 07/18/2024 | 276/2289/48024 | 9.2 | Favorite, Family | Gmail |
| Contact 3 | 20:57:12 07/18/2024 | 218/3117/54898 | 8.9 | Favorite, Close Friend | SMS |
| Contact 4 | 12:45:13 04/04/2024 | 0/0/212 | 0.7 | Favorite, Family | Facebook Messenger |
| Contact 5 | 13:07:13 07/18/2024 | 56/315/2978 | 5.6 | Favorite, Family | iMessage |
| Contact 6 | 07:33:14 05/15/2024 | 0/0/515 | 0.9 | Favorite, Close Friend | WhatsApp |
| Contact 7 | 0:01:14 01/01/2024 | 0/0/32 | 0.2 | Favorite, Family | SMS |
| Contact 8 | 18:12:55 06/22/2024 | 0/0/3408 | 2.3 | Favorite, Close Friend | iMessage |
| Contact 9 | 18:09:12 07/18/2024 | 4/23/338 | 3.7 | Favorite, Family | iMessage |
| Contact 10 | 02:02:02 07/19/2024 | 89/562/4876 | 6.8 | Friend | Gmail |
| Contact 11 | 00:17:34 02/18/2024 | 0/0/17 | 0.2 | Acquaintance | SMS |
| Contact 12 | 11:34:12 07/18/2024 | 16/78/988 | 4.1 | Coworker | Phone Call |
| Contact 13 | 14:33:21 07/18/2024 | 16/136/379 | 5.2 | Coworker | iMessage |
| Contact 14 | 09:17:57 03/25/2024 | 0/0/15 | 0.1 | Acquaintance | Snapchat |
| Contact 15 | 20:57:12 07/17/2024 | 13/39/444 | 4 | Coworker | SMS |
| Contact N | ... | ... | ... | ... | ... |

108a

| Contact | Last Communication Timestamp | Communications Exchanged Over Last Week/Month/Year | Overall Frequency Score | Contact Type | Primary Communication Platform |
|---|---|---|---|---|---|
| Contact 1 | 14:33:21 07/18/2024 | 322/3089/92376 | 10 | Favorite, Close Friend | iMessage |
| Contact 2 | 09:17:57 07/18/2024 | 276/2289/48024 | 9.2 | Favorite, Family | Gmail |
| Contact 3 | 20:57:12 07/18/2024 | 218/3117/54898 | 8.9 | Favorite, Close Friend | SMS |
| Contact 4 | 12:45:13 04/04/2024 | 0/0/212 | 0.7 | Favorite, Family | Facebook Messenger |
| Contact 5 | 13:07:13 07/18/2024 | 56/315/2978 | 5.6 | Favorite, Family | iMessage |
| Contact 6 | 07:33:14 05/15/2024 | 0/0/515 | 0.9 | Favorite, Close Friend | WhatsApp |
| Contact 7 | 0:01:14 01/01/2024 | 0/0/32 | 0.2 | Favorite, Family | SMS |
| Contact 8 | 18:12:55 06/22/2024 | 0/0/3408 | 2.3 | Favorite, Close Friend | iMessage |
| Contact 9 | 18:09:12 07/18/2024 | 4/23/338 | 3.7 | Favorite, Family | iMessage |
| Contact 10 | 02:02:02 07/19/2024 | 89/562/4876 | 6.8 | Friend | Gmail |
| Contact 11 | 00:17:34 02/18/2024 | 0/0/17 | 0.2 | Acquaintance | SMS |
| Contact 12 | 11:34:12 07/18/2024 | 16/78/988 | 4.1 | Coworker | Phone Call |
| Contact 13 | 14:33:21 07/18/2024 | 16/136/379 | 5.2 | Coworker | iMessage |
| Contact 14 | 09:17:57 03/25/2024 | 0/0/15 | 0.1 | Acquaintance | Snapchat |
| Contact 15 | 20:57:12 07/17/2024 | 13/39/444 | 4 | Coworker | SMS |
| Contact N | ... | ... | ... | ... | ... |

FIG. 1B

SYSTEMS AND METHODS FOR AUTOMATED UPDATING OF CONTACT INFORMATION

BACKGROUND

This disclosure is related to managing contact information, and more particularly, to systems and related methods for enabling continuity of communication between users when there is a change in the contact details of a user.

SUMMARY

Users communicate through various communication channels such as through email, telephone calls, and messaging applications. For each communication channel, every user is associated with unique contact information (e.g., email address, phone number, or any other suitable data, or any combination thereof). Email supports the transmission of messages and attachments across networks using standardized protocols like Simple Mail Transfer Protocol (SMTP) and Internet Message Access Protocol (IMAP). Telephone calls leverage telecommunication networks to facilitate direct voice calls and Short Message Service (SMS) messaging, utilizing protocols such as Global System for Mobile Communications (GSM) or Code Division Multiple Access (CDMA) for signal transmission. Messaging applications employ Internet-based protocols like Extensible Messaging and Presence Protocol (XMPP) or proprietary protocols to enable real-time text exchanges and voice and video calls across cellular networks.

In the realm of modern telecommunications, maintaining seamless communication across various platforms can be challenging, especially when changes occur in a user's contact information, user's connectivity preferences, or based on varying connectivity status at a user's device when in certain geographic locations. In one approach, when users modify their primary contact details such as phone numbers or email addresses, the update process involves manually notifying each contact about these changes to avoid disruptions in connectivity. This manual process is not only time-consuming but also prone to errors, potentially leading to missed communications or breaks in ongoing conversations.

Moreover, the issue becomes even more complex when users travel and opt to change their connectivity settings, such as switching from regular cellular service to exclusively using Wi-Fi networks. For instance, users who typically use their phone number to communicate may prefer to use Wi-Fi instead of cellular networks to avoid roaming charges. In such scenarios, this switch can result in messages not being delivered as they are still routed to a phone number that is not active in a foreign network.

Additionally, the proliferation of dual-subscriber identity module (SIM) and electronic subscriber identity module (eSIM) technologies adds another layer of complexity. Users frequently switch between different network providers and SIM cards, especially when traveling between countries. Each switch requires updates to the user's contact information across various platforms and devices, which can be cumbersome to manage effectively. Currently, there is no unified system to handle these changes dynamically, leading to potential lapses in communication and the inconvenience of managing multiple message threads with the same contact across different numbers or email addresses.

In another approach, when a user's contact information changes, every contact that the user has stored at their device, SIM, or eSIM, or has communicated with previously is notified of the change. However, users notoriously leave contacts stored in their phone that they have never communicated with, or only rarely communicated with, and thus this approach may be undesirable as contacts that the user may have communicated with very few times (e.g., a realtor) or not at all, and/or has last communicated with a relatively long time ago (e.g., 10 years ago), may nonetheless be provided with the user's updated contact information. Moreover, contacts that a user does not wish to have their updated contact information (e.g., an ex-spouse or an ex-partner) may nonetheless be provided with the user's updated contact information. There is a need for a more flexible mechanism, and a need for an improved user interface, for selectively notifying certain desirable contacts of the user's updated contact information.

To overcome these problems, systems and methods are disclosed herein for automating the process of updating contact details and managing the seamless transition of communication preferences across different networks and devices. In some embodiments, the system determines, for a user associated with a plurality of contacts, a change from first contact information to second contact information. In some implementations, the system identifies, based at least in part on a communication history of the user, a subset of the plurality of contacts. In some embodiments, the system provides, to a device of the user, an option to notify the subset of the plurality of contacts of the change from the first contact information to the second contact information. In some implementations, based on input received from the user, the system transmits a notification to the subset of the plurality of contacts of the change from the first contact information to the second contact information.

Such aspects enhance the user experience by removing the burden of manual updates while also ensuring that communication remains consistent and reliable, regardless of changes in contact details or network connectivity (e.g., cellular data is unavailable to user). Further, the disclosed systems and methods account for user privacy and preferences (e.g., selectivity in which contacts are informed of a change in contact information), such as, for example, by taking into account a user's communication frequency, favorite status of contacts, activity in ongoing conversations, and/or any other suitable criteria. Such aspects help avoid the circumstance where every contact stored in relation to the user's profile, and/or every contact the user previously communicated with, is notified of the updated contact information, and instead enables selective notification of contacts the user is likely to want to have the updated contact information. In some embodiments, the disclosed techniques provide for improved user interfaces to facilitate such selective notification, e.g., based on detecting a suitable time (e.g., when a user is changing their number or detected to be using a newly added eSIM), and intelligently provide for output recommendations of one or more contacts, and/or one or more groups of contacts, to which the updated contact information should be communicated.

In some embodiments, a change from first contact information to second contact information is determined for a user associated with a plurality of contacts. In some implementations, a subset of the plurality of contacts is identified based at least in part on a communication history of the user. In some embodiments, an option to notify the subset of the plurality of contacts of the change from the first contact information to the second confirmation is provided to a device of the user. In some implementations, based on input received from the user, a notification indicating the change from the first contact information to the second contact information of the user is transmitted to the subset of the plurality of contacts.

In some embodiments, a first and a second subset of the plurality of contacts are identified based on the communication history of the user. In In some implementations, the first subset is notified of the change from the first contact information to the second contact information, and the second subset is not notified based on the communication history of the second subset. In some embodiments, the plurality of contacts are organized into a plurality of subsets of contacts based at least in part on the communication history of the user. In some implementations, the system provides selectable user interface elements to select one or more of the plurality of subsets of contacts to be notified of the change from the first contact information to the second contact information and the notification indicating the change from the first contact information to the second contact information of the user is transmitted to the contacts of the selected subsets of contacts. In some embodiments, the option to notify the subset of the plurality of contacts of the change from the first contact information to the second contact information comprises an option that enables the user to specify a message to be included with a notification of the change from the first contact information to the second contact information.

In some embodiments, the change from the first contact information to the second contact information occurs at a first time and the communication history of the user comprises a plurality of timestamps corresponding to a plurality of communications between the plurality of contacts and the user. In some implementations, the subset of the plurality of contacts is identified as one or more contacts having timestamps of the plurality of timestamps that indicate a last communication with the user within a threshold amount of time from the first time. In some implementations, the communication history of the user comprises a plurality of frequency scores corresponding to a frequency of interaction between the user and each contact of the plurality of contacts. In some embodiments, the subset of the plurality of contacts is identified as one or more contacts having a respective frequency score that is above a threshold value. In some implementations, the communication history of the user comprises a social graph based on messages exchanged between the first contact information and a plurality of contact information. In some embodiments, the change from the first contact information to the second contact information is a temporary change, and the notification transmitted to the subset of the plurality of contacts includes notice indicative of the temporary change. In some implementations, the system determines the change from the first contact information to the second contact information by detecting that a new eSIM is being used in association with the device of the user or that a different eSIM has been designated as a primary eSIM of the device. For example, determining the change from the first contact information to the second contact information may comprise detecting that an electronic subscriber identity module (eSIM), not previously installed at the device of the user, is being used in association with the device of the user, and the option to notify the subset of the plurality of contacts is provided based on detecting the eSIM is being used in association with the device of the user In some embodiments, a plurality of message threads associated with the first contact information comprising a plurality of messages exchanged with the subset of the plurality of contacts while the device of the user was associated with the first contact information are identified and linked from the first contact information to the second contact information to enable the device of the user, associated with the second contact information, to provide for display the messages received prior to the change from the first contact information to the second contact information. In some embodiments, message threads associated with the first contact information while the user was associated with the first contact information and stored at the devices of the plurality of contacts are identified and linked from the first contact information to the second contact information to enable the devices of the plurality of contacts to provide for display the messages received prior to the change from the first contact information to the second contact information In some implementations, a preferred communication platform is identified for each contact of the plurality of contacts and notifying the subset of the plurality of contacts comprises notifying each contact of the subset of the plurality of contacts through their respective preferred communication platform. In some embodiments, the system receives a message specifying the first contact information and intended for the user from a particular contact of the plurality of contacts that was not notified of the change. In some implementations, the system prevents the message from the particular contact from being delivered to a device associated with the first contact information and provides an indication to device of the user associated with the second contact information and no longer associated with the first contact information, of an attempt by the particular contact to message the user using the first contact information. In some implementations, the indication comprises an option to notify the particular contact of the change from the first contact information to the second contact information.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
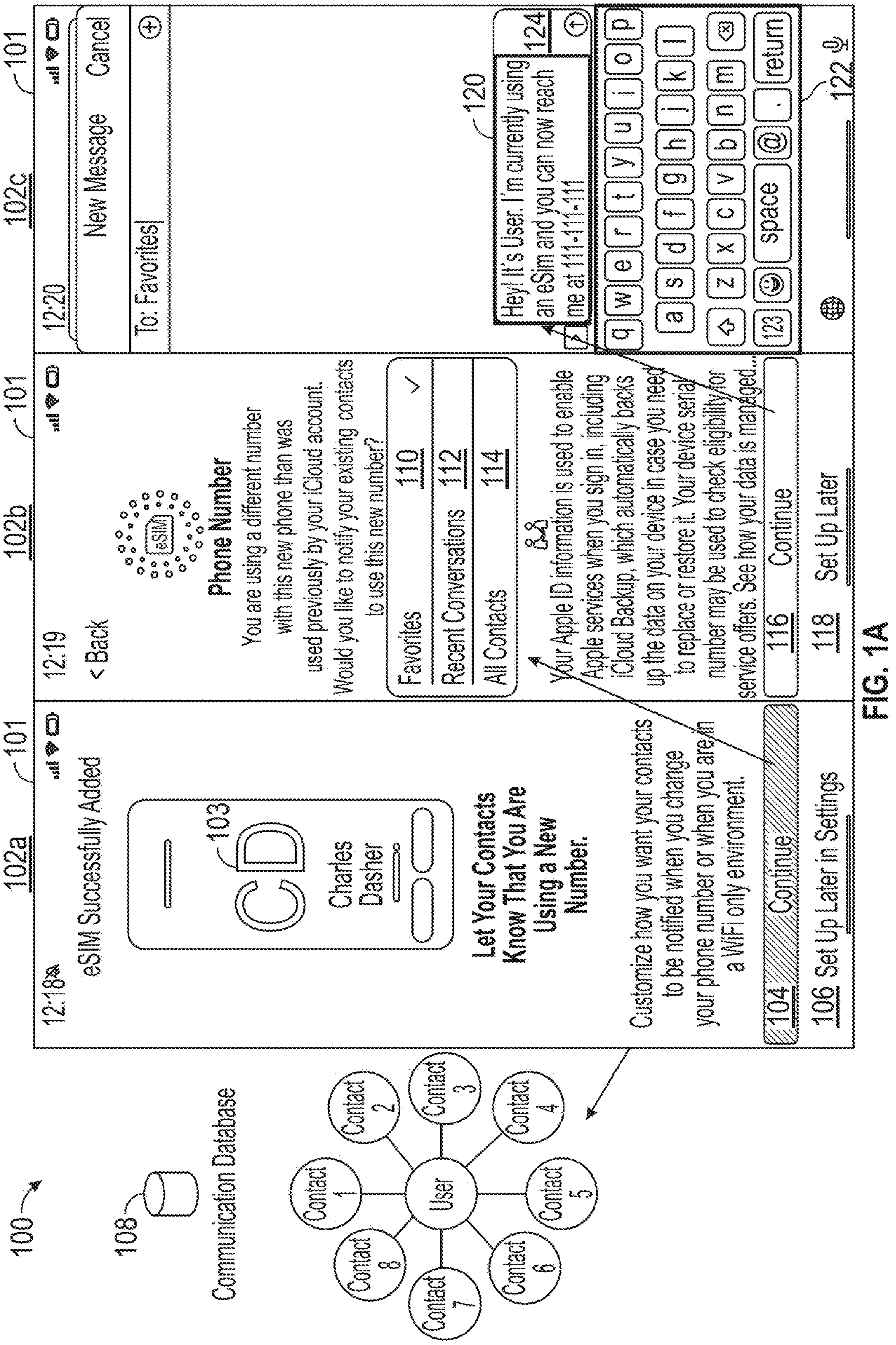
FIGS. 1A-1B depict an illustrative system for notifying a subset of contacts of a change to contact details of a user, in accordance with some embodiments of this disclosure.

Throughout the specification the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

The disclosed methods and systems enhance the management and continuity of communication between users when there are changes in their contact details, such as phone numbers or email addresses, and/or any other suitable change in contact details. This is useful in scenarios such as, for example, involving the switching of eSIM, designating an existing eSIM as primary, changes to phone numbers, or modifications to email addresses associated with user accounts like iCloud, and/or any other suitable scenarios. The system includes several components designed to automate and streamline the process of updating user contact information across various platforms and networks, to ensure seamless management and continuity of communication, especially when users experience changes in their contact details and connectivity.

Such systems and methods, for example, actively monitor the user's contact information, including updates to a user's profile or contact card, changes in eSIM, or shifts in cellular connectivity status, and/or any other suitable updates. In some embodiments, the system accounts for user preferences in connectivity, such as, for example, choosing to use Wi-Fi networks instead of cellular services while traveling abroad. In some implementations, a selection module (e.g., 308 of FIG. 3, 808 of FIG. 8, etc.) within the system allows the user to choose whether to notify all contacts or only a specific subset about these changes or may be configured to automatically perform such notifications. Further, for example, the system accesses a communication history of a user whose contact information has changed to recommend specific contacts to be notified of the change. In some embodiments, a notification module (e.g., 310 of FIG. 3., 810 of FIG. 8, etc.) is responsible for dispatching notifications through a communication channel (e.g., iMessage, SMS, or voice calls, and/or any other suitable communication channel) based on the user's selection of contacts to notify and/or otherwise update regarding the change in the contact details of the user. In some implementations, the change in contact information can be triggered by updates such as a new phone number, a new email address, a switch in an eSIM, or a change in connectivity, and/or any other suitable detected change. In some embodiments, the system provides change notifications based on an input received from a user in the parameters of the mobile device using application programming interfaces (APIs) (e.g., Apple's Core Telephony, or any other suitable API), which may provide access to various telephony parameters (e.g., phone number, SIM identifiers, Internet availability, or any other suitable data, or any combination thereof). In some embodiments, contacts are notified of the change via a change notification that is sent using the best method (e.g., the most preferred method, and/or the method having the best current connectivity or communication ability) for each contact.

In some embodiments, the system enables the user to specify whether the change in contact details is permanent or temporary. For example, for temporary changes, the system allows the user to define a duration for the validity of the updated contact details. In some embodiments, the system integrates with cloud services to update the contact details of the user in cloud-based accounts and links new message threads with existing threads to ensure communication continuity. For example, such integration may include adjusting message routing based on the updated contact details to direct incoming messages appropriately.

Additionally, in some implementations, the notification module (e.g., 310 of FIG. 3, 810 of FIG. 8, etc.) generates customized messages that include the user's updated contact details and, optionally, a message explaining the reason for the change. In some embodiments, the selection module (e.g., 308 of FIG. 3, 808 of FIG. 8, etc.) offers a user interface (e.g., 102*b* of FIG. 1A) to receive selections of individual contacts or groups of contacts to receive the change notification. In some embodiments, a privacy management module (e.g., 604 of FIG. 6) is incorporated to ensure that updates are sent only to approved contacts based on user-defined privacy settings, further securing the user's control over their personal information.

FIG. 1A depicts an illustrative system 100 for notifying a subset of contacts of a change to contact details of a user, in accordance with some embodiments of this disclosure. In some embodiments, system 100 (also referred to herein as "the system") may comprise or correspond to and/or be implemented by a telecommunications service provider, an Internet service provider, an application service provider, a provider of mobile devices or other computing devices, any suitable communications provider, or any other suitable device, service, or platform, or any combination thereof. The system may comprise or correspond to an application, which may be executed at least in part on user device 101 and/or at one or more remote servers (e.g., server 1404 of FIG. 14 and/or media content source 1402 of FIG. 14) and/or at or distributed across any of one or more other suitable computing devices or telecommunications equipment or network equipment, in communication over any suitable number and/or types of networks (e.g., the Internet, cellular networks, satellite networks, and/or any other suitable networks). The application may be configured to perform the functionalities (or any suitable portion of the functionalities) described herein. In some embodiments, the application and/or the system may be a stand-alone application or may be incorporated as part of any suitable application or system. The application and/or system may comprise or employ any suitable number of displays, sensors or devices such as those described in FIGS. 1-16, or any other suitable software and/or hardware components, or any combination thereof.

In some embodiments, the application may be installed at or otherwise provided to a particular computing device, may be provided via an API, or may be provided as an add-on application to another platform or application. In some embodiments, software tools (e.g., one or more software development kits, or SDKs) may be provided to any suitable party, to enable the party to implement the functionalities described herein.

Figure 13:
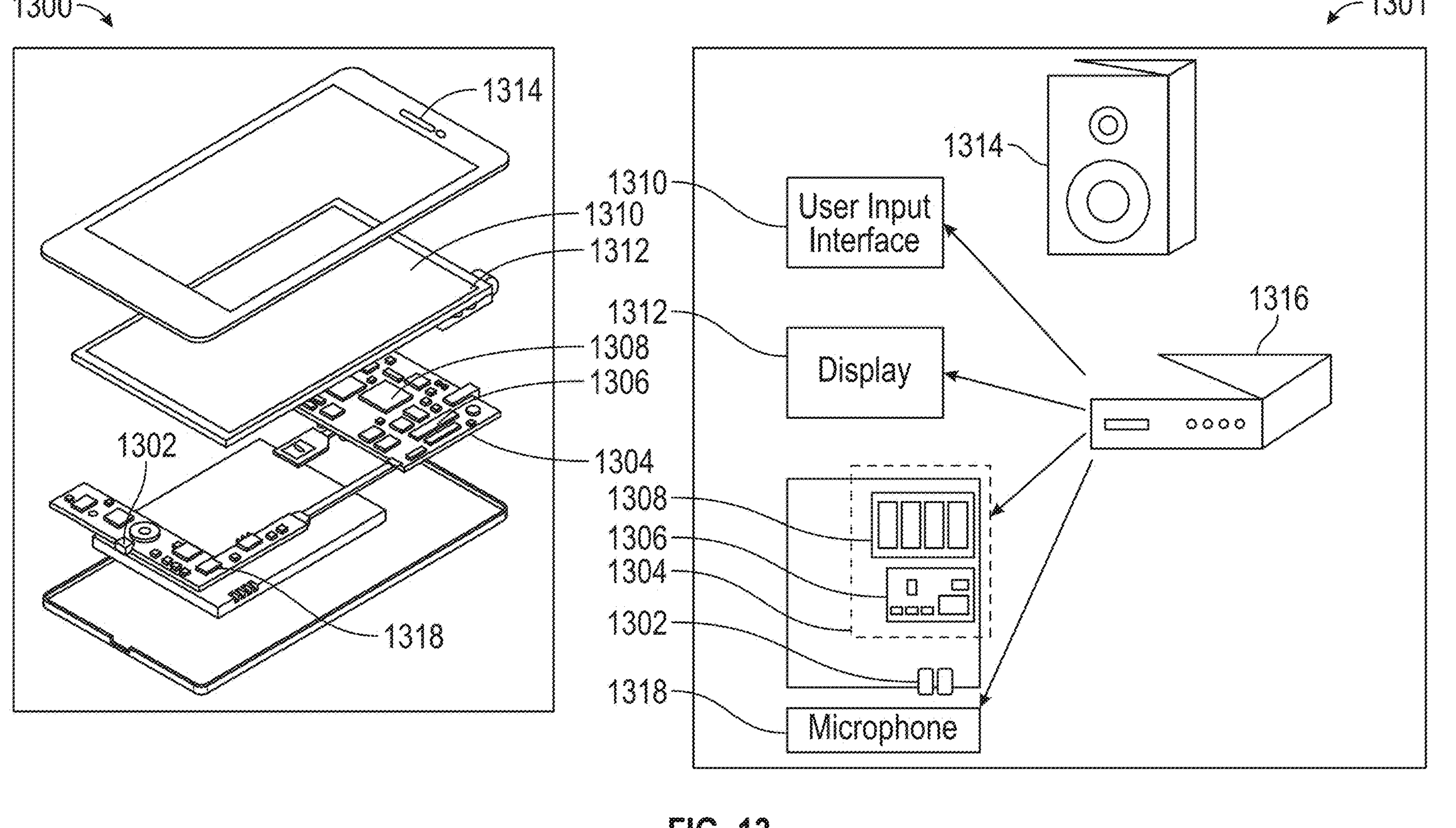
FIG. 13 shows illustrative devices and systems for managing communications for a user whose contact details have changed, in accordance with some embodiments of this disclosure.
Figure 14:
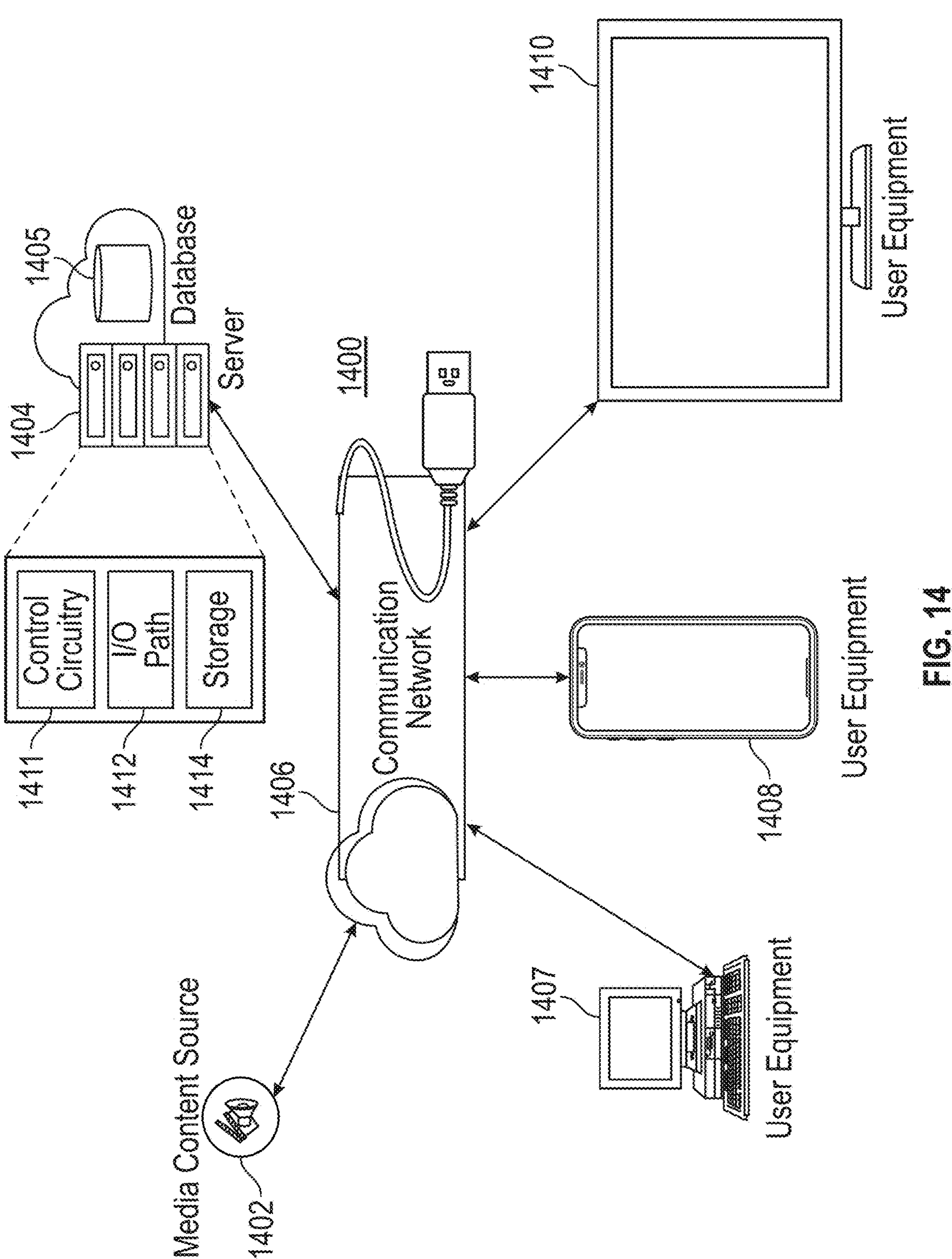
FIG. 14 shows illustrative devices and systems for managing communications for a user whose contact details have changed, in accordance with some embodiments of this disclosure.

In some implementations, system 100 may comprise user device 101 comprising software and hardware components, such as, for example, control circuitry and memory, and may correspond to one or more of devices 1407, 1408, and/or 1410 of FIG. 14. In some embodiments, the control circuitry of user device 101 is control circuitry 1304, as further described in FIG. 13 below. The hardware components and applications installed on user device 101 are managed by an operating system (OS) (e.g., iOS, Android, webOS). System 100 may execute the process depicted in FIGS. 1A-1B based on instructions stored in non-transitory memory (e.g., non-transitory memory 1308 of FIG. 13, or storage 1414 of FIG. 14). System 100 enables user device 101 of a user (e.g., the user indicated at 103) to communicate with devices of other users (e.g., contacts of user 103) over any suitable network (e.g., the Internet, cellular networks, or any other suitable network, or any combination thereof). In some approaches, user device 101 communicates over communication network 1406 of FIG. 14. System 100 may access the data provided by other applications on user device 101 (e.g., Contacts, Messages, Facebook™ Messenger, Google™ Messages, applications native to the OS or applications downloaded to the OS, or any other suitable application, or any suitable combination thereof), one or more of which may be provided by one or more servers. System 100 may access the applications installed on user device 101 by using an API, a software interface that allows two or more applications to communicate with each other. The API (e.g., Apples Core Telephony) provides user device 101 access to various telephony parameters (e.g., phone number, SIM identifiers, Internet availability, or any other suitable data, or any combination thereof).

In some embodiments, user device 101 may be a mobile device such as, for example, a smartphone or tablet. In some embodiments, user device 101 may comprise or correspond to a laptop computer, a personal computer, a desktop computer, a smart television, a smart watch or wearable device, smart glasses, a stereoscopic display, a wearable camera, extended reality (XR) glasses, XR goggles, a near-eye display device, or any other suitable user equipment or computing device, or any combination thereof.

In some embodiments, system 100 consistently (or intermittently) monitors the contact information of the user to detect a change. In some implementations, system 100 comprises a detection module (e.g., 306 of FIG. 3, 804 of FIG. 8, etc.) which consistently (or intermittently) monitors the contact information of user 103 to detect a change in the contact details of user 103. As shown in FIG. 1A, in some embodiments, system 100 detects that an eSIM has been successfully added to user device 101, thus changing the telephone number associated with user device 101. In some implementations, system 100 detects that a new eSIM is being used as the primary eSIM of a user, thus changing the telephone number associated with user device 101. For example, when a user has more than one eSIM associated with their device (e.g., an eSIM corresponding to a carrier in Europe and an eSIM corresponding to a carrier in the US), system 100 may receive an indication from the user designating which eSIM is to be used as the primary contact information or system 100 may automatically switch which eSIM functions as the primary contact information based on a determined location of the user device. In some implementations, a user may select different eSIMs to be used at different times, for different durations, or based on predefined settings. In some embodiments, system 100 detects any of: an update to the profile and/or settings of user 103, an update to the contact card of user 103, an update to a unique identifier (e.g., telephone number, email address, an identifier of a user in an application or platform, or any other suitable unique identifier) a change in eSIM, or a shift in cellular connectivity status, or any other suitable change in contact information. In some embodiments, system 100 provides a user interface (e.g., a touchscreen interface, mouse interface, or any other suitable interface, or any combination thereof), such as user interfaces 102*a*, 102*b*, and/or 102*c*, which displays various display configurations to the user and allows for reception of user inputs.

In some embodiments, system 100 generates for display user interface 102*a*. As shown in FIG. 1A, system 100 detects the change in contact information of user 103, and based on (and/or in response to) such detection, user interface 102*a* indicates the detected change in contact details (e.g., an eSIM has been added, thus changing the number associated with the user) and prompts the user of the option to notify and/or otherwise update their contacts regarding the change in their contact details (e.g., the new number). System 100 may cause user interface 102*a* to provide selectable option 104 to continue in the process of updating contacts of the user of the change in contact details and/or provide selectable option 106 to exit the contact updating process and allow for the user to set up the contact updating process later in settings. In some embodiments, the generation of user interface 102*a* is triggered by detection of a new phone number, a new email address, a switch in an eSIM, or a change in connectivity. In some implementations, the generation of user interface 102*a* is initiated by the system receiving a user input indicating that the connectivity preference of the user has changed. In some implementations, the generation of user interface 102*a* is initiated based on the OS of user device 101 having received, in the parameters of user device 101, a "subscription" or "registration" for change notifications. In some implementations, when the OS of user device 101 has not received, in the parameters of user device 101, a "subscription" or "registration" for change notifications, the change in contact details associated with user device 101 is not detected by system 100 and user interface 102*a* is not generated for display, as further described in FIG. 2.

In some implementations, upon receiving a user input of selectable option 104 to continue in the process of updating contacts of the user of the change in contact details, the system 100 accesses communication database 108. In some implementations, communication database 108 is stored in storage 1414 of FIG. 14. In some embodiments, communication database 108 comprises a social graph or social mapping of the user and a plurality of contacts that the user has communicated with at various times using various platforms and/or communication modalities and/or unique identifiers. In some embodiments, communication database 108 contains a plurality of timestamps corresponding to a plurality of communications between the plurality of contacts and the user. In some implementations, communication database 108 contains a plurality of timestamps corresponding to the last communication between the user and each contact of the user. In some embodiments, communication database 108 contains a plurality of frequency scores corresponding to a frequency of interaction between the user and each contact of the plurality of contacts. For example, a contact that communicates with user 103, and/or that user 103 communicates with, daily (e.g., a partner or best friend) has a higher frequency score than a contact that the user communicates with only every six months (e.g., a dental office).

In some implementations, communication database 108 is based on user communications across a plurality of apps installed on user device 101 (e.g., Facebook Messenger™, Google Messages™, Snapchat™, or any other suitable application, or any combination thereof). For example, database 108 may store, for a specific user, multiple profiles or telephone numbers, and communications between user 103 and the specific user across any of the platforms may be aggregated in determining a frequency of communication and/or a last communication with the user and/or may be used for storing any other suitable data. In some embodiments, communication database 108 includes a contact type (e.g., family member, close friend, favorite, coworker, or any other suitable contact type, or any combination thereof) for each contact. In some implementations, the contact type is defined by the user (e.g., the user defines the contact type within the contact profile for the contact saved to user device 101). For example, the user may indicate that the contact "Janet" is a close friend within the contact profile of "Janet." In some embodiments, the contact type is determined based on analyzing at least one of the frequency of communication between the user and the contact, the content of the communications exchanged between the user and the contact, or the communication platforms that the user and the contact communicate through. For example, based on the user emailing a contact only on Mondays through Fridays, the system determines that the contact is of a coworker contact type. In some implementations, communication database 108 comprises at least a portion of past communications between the user and a plurality of contacts. In some embodiments, when a contact is associated with a business (e.g., a car dealership), the system (e.g., system 100) automatically notifies the business of the change in contact details of the user (e.g., user 103) and/or automatically updates the contact records of the business.

Figure 1B:
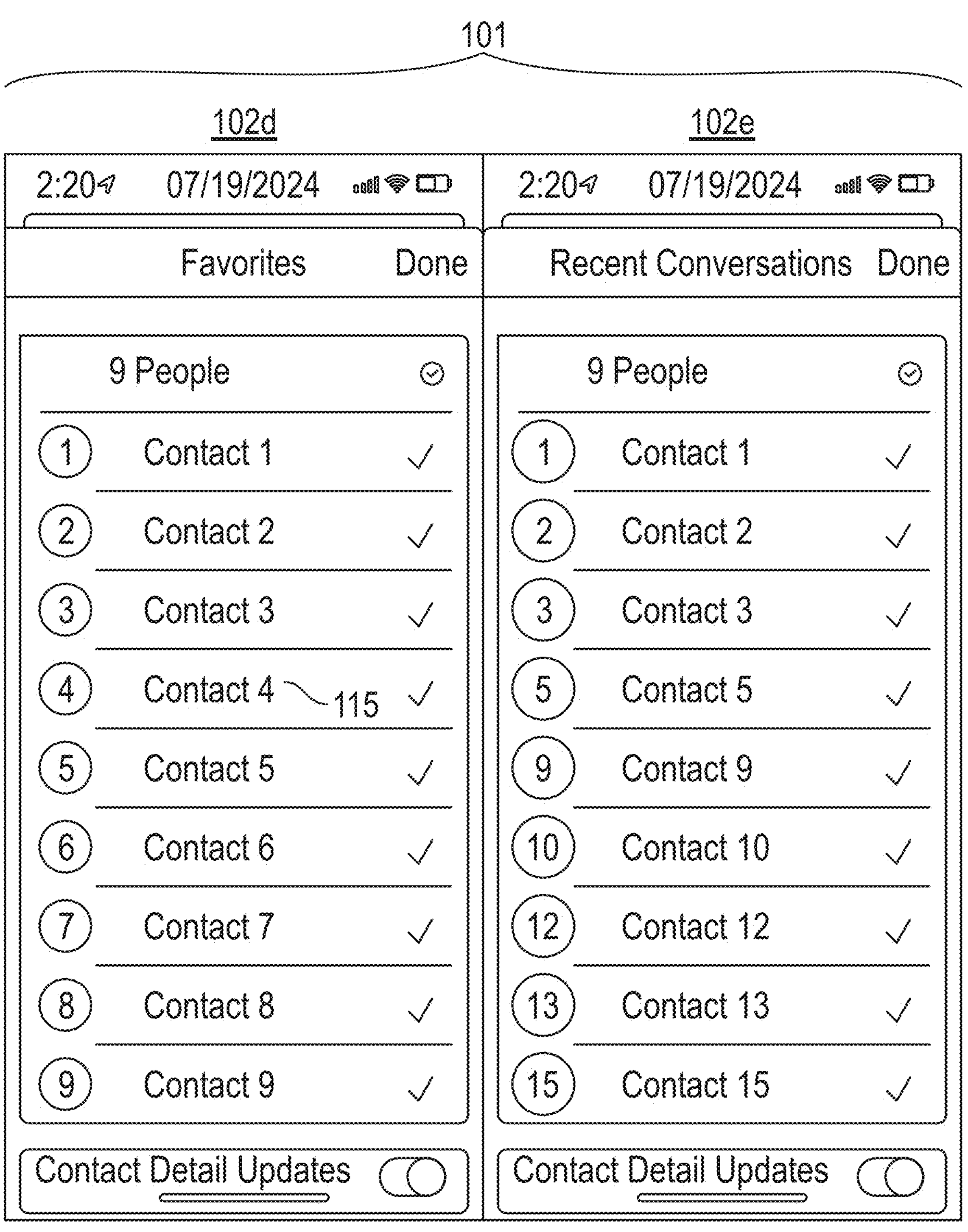

In some implementations, communication database 108 comprises database **108*a* of FIG. 1B. In some embodiments, database 108*a* comprises stored data corresponding to each contact of user 103 (e.g., Contact 1 through Contact N); a last communication timestamp for each contact; a number of communications (e.g., texts, calls, direct messages, or any other suitable data, or any combination thereof) exchanged between user 103 and each contact over the last week, month, and year; an overall frequency score (e.g., a low score of 0 corresponding to infrequent communication and a high score of 10 corresponding to frequent, consistent communication) for each contact calculated based on how frequently user 103 and the respective contact communicates; at least one contact type for each contact (e.g., Favorite, Close Friend, Family, or any other suitable data, or any combination thereof); and/or a primary communication platform for each contact (e.g., iMessage, Gmail, SMS, or any other suitable platform, or any combination thereof). For example, database 108*a* comprises stored data corresponding to Contact 1 including that the last communication between Contact 1 and user 103 occurred at 14:33:21 on Jul. 18, 2024 (i.e., last communication timestamp); that Contact 1 and user 103 have exchanged 322 communications in the last week, 3,089 communications in the last month, and 92,376 communication in the last year; an overall frequency score for Contact 1 of 10; a contact type of "Favorite" and "Close Friend"; and a primary communication platform of iMessage. It should be appreciated that any number and type of stored data corresponding to each contact of user 103 may be stored in database 108*a*. In some embodiments, database 108*a* comprises stored data corresponding to social media accounts associated with each contact of user 103 and/or data corresponding to the interactions between user 103** and each contact on one or more social media services.

In some implementations, a selection module (e.g., 308 of FIG. 3, 808 of FIG. 8, etc.) determines a recommendation of contacts to be notified of the change in the contact information of the user based on communication database 108. In some embodiments, the selection module organizes the contacts into a set of contact groups to be presented to the user via the user interface (e.g., **102*b* of FIG. 1A) as selectable options of groups to be notified of the change in the contact information of the user. In some implementations, the contact groups are based on the contact type of each contact as stored in communication database 108. In some embodiments, the selection module determines the recommendation of contacts to be notified of the change in the contact information of the user based on the type of change in the contact information (e.g., change in number, change in email, or any other suitable change, or any combination thereof) and the preferred communication platform of each contact. For example, when the change in contact information is a change in the email address of the user, and the contact "Nick" communicates with the user only via text (e.g., using the phone number of the user), "Nick" is not selected by the selection module. In some implementations, the selection module determines the recommendation of contacts to be notified of the change based on previous contact selections of the user. For example, if the user selected Contacts 1, 2, and 3 to be notified of the change in the contact details of the user three months ago, the selection module may select Contacts 1, 2, and 3 to be notified of the most recent change in the contact details of the user. In some embodiments, the selection module determines the recommendation of contacts to be notified of the change based on a label of the contact information of the user. For example, if a contact information determined to be a "business" contact information is changed, the selection module may select contacts determined to be "business" contacts to be notified and/or otherwise updated regarding the change in the contact details of the user. In some implementations, the contact information type (e.g., business, personal, travel, etc.) is determined based on user input, a cellular plan label, or an analysis of communications associated with the contact information. In some embodiments, when a new eSIM is added to a user device (e.g., user device 101), a user may label or title the eSIM and/or designate a subset of contacts to be associated with the eSIM. For example, when a change occurs in regard to the eSIM, the designated subset of contacts may be automatically notified or selected as a recommendation to be notified of the change. In some embodiments, all contacts on a shared family plan may be automatically notified of a change in the contact details of a user or otherwise have specially stored instructions based on being on a shared account (e.g., an AT&T carrier plan). In some implementations, different contacts are automatically notified of the change in the contact details of the user based on the contact information type and/or user specified settings, as further discussed in regard to FIG. 2**.

In some embodiments, upon receiving the user input of selectable option 104 to continue in the process of updating contacts of the user of the change in contact details, the system 100 generates user interface 102*b* for display. In some implementations, user interface 102*b* provides a plurality of selectable contact groups to be selected by the user for receiving the updated contact details of the user and a plurality of selectable options for proceeding through the updating process. As shown in FIG. 1A, user interface 102*b* provides selectable option 110 corresponding to the contacts marked as favorites, selectable option 112 corresponding to contacts that the user has recently communicated with, selectable option 114 corresponding to all contacts of the user, selectable option 116 to continue in the process of updating contacts of the user of the change in contact details, and selectable option 118 to exit the contact updating process and allow for the user to set up the contact updating process later. In some implementations, user interface 102*b* displays a selectable option corresponding to every contact group determined by the selection module (e.g., 308 of FIG. 3, 808 of FIG. 8, etc.). In some embodiments, user interface 102*b* provides a selectable option for every contact of the user. In some implementations, user interface 102*b* provides a selectable option corresponding to the recommendation of contacts determined by the selection module.

As shown in FIG. 1B, system 100 may provide, at user interface 102*d* or user interface 102*e*, or another suitable user interface, based on selection of one or more of selectable options 110, 112, or 114, the contacts of user 103 that fall into such selected group(s) corresponding to 110, 112, and/or 114, to indicate to the user which contacts are to be notified of the contact information change of user 103. For example, in some embodiments, upon receiving a selection of selectable option 110, system 100 generates user interface 102*d* for display. In some implementations, user interface 102*d* comprises a listing of contacts identified as "Favorites" (e.g., Contacts 1, 2, 3, 4, 5, 6, 7, 8, and 9) and an indication (e.g., a check mark or any other suitable indication, or any combination thereof) that the contact is to be notified of the change in the contact details of user 103. In some embodiments, system 100 provides, at user interface 102*d*, the option to edit which contacts of the "Favorites" contact group are to be notified of the change in the contact details of user 103. For example, upon receiving a selection of selectable option 115, corresponding to Contact 4, system 100 removes Contact 4 from the listing of contacts to be notified of the change in the contact details of user 103 and updates user 102*d* to indicate that Contact 4 will not be notified of the change (e.g., removes the check mark). For example, in some embodiments, upon receiving a selection of selectable option 112, system 100 generates user interface 102*e* for display. In some implementations, user interface 102*e* comprises a listing of contacts identified as "Recent Conversations" (e.g., Contacts 1, 2, 3, 5, 9, 10, 12, 13, 15) and an indication (e.g., a check mark or any other suitable indication, or any combination thereof) that the contact is to be notified of the change in the contact details of user 103. In some embodiments, system 100 provides, at user interface 102*e*, the option to edit which contacts of the "Recent Conversations" contact group are to be notified of the change in the contact details of user 103. In some embodiments, system 100 may permit editing at user interface 102*d*, 102*e*, or another suitable user interface, e.g., to add or remove certain users to or from the groups of users corresponding to the options indicated at 110, 112, and/or 114.

In some embodiments, user interface 102*b* provides a selectable option for the user to indicate whether the change in contact details is a temporary change or a permanent change. In some implementations, when the change in contact details is a temporary change, user interface 102*b* allows for a duration for the length of the change to be input by the user. For example, when a user is using an eSIM for a two-week vacation and is now associated with a new phone number, the system receives at least one of a user input specifying that the new phone number will be used for two weeks or a user input specifying a date of return corresponding to when the eSIM will no longer be used. In some embodiments, such determination may be made automatically without receiving such user input, e.g., based on an indication received from a provider associated with the eSIM. In some embodiments, when the change in contact details of the user is based on a change in connectivity preferences of the user, user interface 102*b* provides a plurality of selectable options corresponding to communication avenues to be selected by the user as preferred communication avenues. In some implementations, network connectivity preferences are based on an eSIM or carrier. In some embodiments, network connectivity preferences are based on cellular data being turned off (e.g., because the user is traveling or has reached a data cap). In some implementations, network connectivity preferences are related to when the user is in a Wi-Fi only situation (e.g., while on a plane) or transitioning. For example, if the user is traveling internationally and has indicated their preference to utilize only Wi-Fi networks, system 100 may cause user interface 102*b* to provide a plurality of selectable options corresponding to communication platforms or modalities that do not require cellular connectivity (e.g., WhatsApp, email, Internet-based messaging services, or other suitable platforms or modalities, where Wi-Fi is sufficient to utilize them) rather than, for example, SMS. It should be appreciated that user interface 102*b* may include any number of selectable options corresponding to the details of and aspects of the change in contact details of the user.

In some embodiments, user interface 102*b* receives a first user input of selectable option 110 corresponding to the contacts marked as favorites and a second user input of selectable option 118 to continue in the process of updating contacts of the user about the change in contact details. It should be appreciated that user interface 102*b* may receive any number of or combination of user inputs corresponding to the selection of any number of contact groups or individual contacts.

In some embodiments, upon receiving the user input of selectable option 116 to continue in the process of updating contacts of the user of the change in contact details, system 100 generates user interface 102*c* for display. In some implementations, system 100 generates user interface 102*c* for display, comprising a preformatted notification indicating the change in contact details of the user to be sent to the selected contacts (e.g., the "Favorites" group of contacts), an option enabling the user to specify a message to be included with the preformatted notification, and/or a selectable option to send the message. As shown in FIG. 1A, user interface 102*c* generates preformatted message 120 indicating the change in contact details of the user, provides keyboard (or other input mechanism) 122 to enable the user to specify a message to be included with preformatted message 120, and provides selectable option 124 to send the message to the selected contacts. In some implementations, preformatted message 120 indicates a change in the connectivity preferences of the user and the corresponding preferred communication avenues to be used to communicate with the user. In some embodiments, when the change in contact details is a temporary change, preformatted message 120 includes an indication of the temporary change. In some embodiments, when the system has received a duration of the length of the change, preformatted message 120 includes an indication of the duration of the length of the change. In some embodiments, keyboard 122 enables the user to edit the preformatted message (e.g., delete a portion of the preformatted message via the selectable option corresponding to the delete key, add a personalized note via the selectable options corresponding to the letters of the alphabet). In some implementations, system 100 generates a simple notification as opposed to preformatted message 120. In some embodiments, system 100 generates an audio message to be provided to a contact of the user. In some implementations, upon receiving the user input of selectable option 116 to continue in the process of updating contacts of the user of the change in contact details, system 100 generates a prompt to be provided to a contact attempting to contact the user at the old contact information of the user when the contact has been indicated by the user as having permission to the updated contact information. In some embodiments, the prompt provides the contact with guidance for updating the contact information of the user within the device of the contact. In some embodiments, when a user has a plurality of eSIMs corresponding to a plurality of locations (e.g., an eSIM corresponding to a carrier in Europe and an eSIM corresponding to a carrier in the US) and a contact attempts to communicate with the user via a contact information that is not currently active (e.g., the contact attempts to call the user at their US eSIM contact information when the user is in Europe), system 100 will provide the contact with one of an indication of the user's location, an indication of the user's primary contact information (e.g., the Europe eSIM contact information), a recommendation to contact the user via an IP-based messaging app (e.g., FaceTime, WhatsApp, etc.), or an option to reroute the communication to the user's primary contact information.

In some implementations, preformatted message 120 is based on the contact type of the contact group selected to be notified of the change in the contact information of the user. For example: if the "Family" group of contacts is selected, preformatted message 120 includes the greeting "Hey fam!"; if the "Coworker" group of contacts is selected, preformatted message 108 includes the greeting "Dear colleague,"; and if the "Favorites" group of contacts is selected, preformatted message 108 includes the greeting, "Hey bestie!" In some embodiments, preformatted message 120 is generated by a notification module (e.g., 310 of FIG. 3). In some implementations, the notification module generates preformatted message 120 based on at least one of the contact type of the selected contacts; the change in the contact details of the user (e.g., change in phone number, change in email address, or any other suitable change, or any combination thereof); the classification of the change (e.g., temporary, permanent); or the frequency score of the contact being notified and/or otherwise updated regarding the change in the contact details of the user. Preformatted message 120 may be in the form of any suitable electronic communication, e.g., a text message, an email, a push notification, a telephone call, a social media post or message, or any other suitable electronic communication.

In some embodiments, the system receives a user input of selectable option 124 and consequently sends preformatted message 120, optionally edited via keyboard 122, to the selected contacts. In some implementations, when multiple contact groups, each corresponding to a different preformatted message 120, have been selected, preformatted message 120 corresponds to the first selected contact group. In some embodiments, upon receiving the user input of selectable option 124, preformatted message 120, optionally edited via keyboard 122, is sent to the contacts of the first selected contact group, and system 100 updates user interface 102*c* to display the preformatted message corresponding to the second selected contact group. In some implementations, the system determines a preferred communication platform (e.g., iMessage, SMS, voice calls, or any other suitable platform, or any combination thereof) for each contact of the selected contacts. In some embodiments, preformatted message 120, optionally edited via keyboard 122, is sent to the preferred communication avenue for each contact. In some implementations, preformatted message 120, as edited via keyboard 122, is sent via the communication platform corresponding to the change in contact details. For example, if the email address of the user has changed, preformatted message 120 is delivered to the corresponding email address of each contact of the selected contacts. In some implementations, preformatted message 120, as edited via keyboard 122, is sent to a best method of communication for each selected contact. For example, if a contact is to be informed of a change in phone number, and the contact is not an iMessage user, the update may occur via an SMS notification (e.g., by sending a contact card as an attachment).

In some embodiments, system 100 implements a cloud service integration module (e.g., 312 of FIG. 3) that simultaneously updates the contact details of the user in cloud-based accounts (e.g., emails, direct messaging services, social media apps, messaging apps, or any other suitable account, or any combination thereof) and maintains a link between the old and new contact details of the user. In some implementations, the cloud service integration module updates the contact details of the user at user devices associated with the contacts notified of the change in the contact details of the user. In some embodiments, the notification indicating the change in the contact details of the user includes an option to update the contact records of the contact. In some implementations, upon receiving a confirmation to update the contact records of a contact, system 100 updates the contact records across all devices associated with the contact. For example, if a contact using an iPhone receives an iMessage comprising contact update details of a user and an option to allow for their contact records to be updated, the system (e.g., by the cloud service integration module) updates all devices associated with the Apple ID of the contact (e.g., updates the contact card of the user stored in the account of the contact, links message threads from the old contact information of the user with the updated contact information).

In some implementations, the cloud service integration module links new message threads associated with the old contact details of the user to the new contact details of the user. For example, when the email associated with the iMessage account of a user changes and a notification (e.g., preformatted message 120) is sent from the new email to the selected contacts, the message thread associated with the old email is linked to the newly established message thread. In some embodiments, the system (e.g., system 100, cloud service integration module 312 of FIG. 3, etc.) automatically reroutes a message specifying the old contact details of the user (e.g., user 103) to the new contact details based on identifying the sender as a business (e.g., a car dealership). For example, when the system receives a message from a car dealership (e.g., "Reminder! Time for your oil change.") at the old contact detail, the system does at least one of rerouting the message to the new contact detail; notifying the user that the car dealership is attempting to message them; providing a selectable option to the user at the user interface (e.g., 102*a* of FIG. 1A, 304 of FIG. 3, etc.) to inform the car dealership of the change in the contact details of the user so the car dealership can update their records; notifying the car dealership that there has been a change in the contact details of the user; providing a selectable option to the car dealership to request the updated contact details of the user; providing the car dealership with the updated contact details of the user; and/or automatically updating the contact records of the car dealership to reflect the new contact details of the user.

In some embodiments, the cloud service integration module (e.g., 312 of FIG. 3) detects and reroutes messages sent by a contact (e.g., a contact stored within communication database 108) associated with user 103 to the original contact information (e.g., of user 103 of FIG. 1) after detection of the change in contact details. Such detection and rerouting may be based on the updated contact details of user 103. In some implementations, messages sent to the original contact information after detection of the change in contact details of user 103 are automatically rerouted to the new contact information of the user. In some embodiments, upon detection of a message being sent by a contact associated with the user specifying the original contact information of the user, system 100 (e.g., notification module 310 of FIG. 3) performs at least one of providing a notification to the contact that the original contact information of user 103 is no longer associated with the user; providing the updated contact details of user 103 to the contact (e.g., via an updated contact card generated by the cloud service integration module); providing a selectable option to the contact to request the new contact information of user 103; providing a notification to user 103 of the attempt by the contact to contact user 103; providing a selectable option to the user to instruct system 100 to provide notice to the contact of the change in the contact details of the user; determining (e.g., via privacy management module 604 of FIG. 6) if the contact is allowed access to the updated contact information of user 103; and/or delivering the message to the user (e.g., at the new contact information of the user).

Additionally, it is common today for users to have multiple eSIMs on their phone. For example, a user may have two different phone numbers associated with the same device. The user may designate one of the phone numbers as the Primary phone number of the user. In some embodiments, when a contact attempts to communicate with a user (e.g., send a message or make a phone call), the number associated with the primary eSIM of the user is used. In some implementations, when a user attempts to communicate with a contact, the number associated with the primary eSIM is used. In some embodiments, when a contact attempts to communicate with a user and the user has previously indicated their preference to utilize a secondary eSIM, the number associated with the secondary eSIM of the user is used. In some implementations, when a user attempts to communicate with a contact, and the user has previously indicated their preference to utilize a secondary eSIM, the number associated with the secondary eSIM of the user is used. In some implementations, when a user attempts to communicate with a contact, the user may indicate their preference to utilize the secondary eSIM and this preference may be stored at the user account or in the cloud. In some embodiments, the change in contact details of the user is based on a temporary switch in eSIMs of the user. For example, a user may have two eSIMS (e.g., phone lines), one with a carrier in Europe, and one with a carrier in the US. The user uses one when in the US and the other in Europe. When the user travels to Europe, the user may automatically enable the Europe eSIM and the contact information associated with the Europe eSIM becomes the primary contact information for the user. In some embodiments, the system (e.g., system 100) updates the contact information of the user on devices that want to contact or communicate with the user. For example, if a friend of the user has both numbers of the user (e.g., the number associated with the Europe eSIM and the number associated with the US eSIM), when the friend attempts to call the user, the system may notify the friend that the user in the US but the friend is calling the number associated with the Europe eSIM or the system may recommend making the call using an Internet-based messaging app (e.g., FaceTime, WhatsApp, etc.). In some embodiments, the switch in eSIM usage is automatic and based on determining that the location of the device of the user (e.g., phone) is in a particular country corresponding to a particular eSIM. In some embodiments, the automatic switch is be based on determining that the location of the device of the user is in a different country and an eSIM labeled as "Travel" is automatically switched on or automatically becomes the "Primary" or default contact information (e.g., number) of the user.

In some embodiments, some contacts are informed of the change in the contact details of the user without the user approving them based on a user preference. For example, the system (e.g., system 100) may include an "Always Notify Contact of Number Change" option to be applied to contacts of the user. Additionally, in the case of designating an existing eSIM as a primary eSIM (e.g., switching back and forth between eSIMs), the system may automatically notify some contacts that the user notified the first time. Further, in some embodiments, the system may notify contacts based on the Cellular Plan Label. Currently, on phones, a line can be labeled as Business, Cellular Data, Personal, Travel, or any other suitable label. For example, if a user were to add a second eSIM to their phone (e.g., another phone number), and label the new number as "Business," the system may recommend the user to inform Business Contacts of the change. For example, Business Contacts may have the original, personal number of the user and providing the new business number to the Business Contacts helps with the transition as it enables the Business Contacts to immediately start contacting the user on the new business number. Contacts may be classified as Business related explicitly (by the user in the Contact Card) or implicitly (based on frequency or by using natural language processing (NLP)). For example, iPhones have a contacts application that may store an explicit designation of a contact as being Business related. In some embodiments, contacts may be stored in an eSIM or on a regular SIM and the system may retrieve the stored contacts to implement the methods disclosed herein. In some embodiments, some contacts are automatically updated or notified. For example, when the system detects a change in the contact information of a user using a family plan including five family members of the user on the same account, the system may automatically notify the five family members of the user of the change in the contact details of the user, automatically update the cloud based contact details of the user, and/or automatically update the contact details of the user within the respective devices of the family members.

Figure 2:
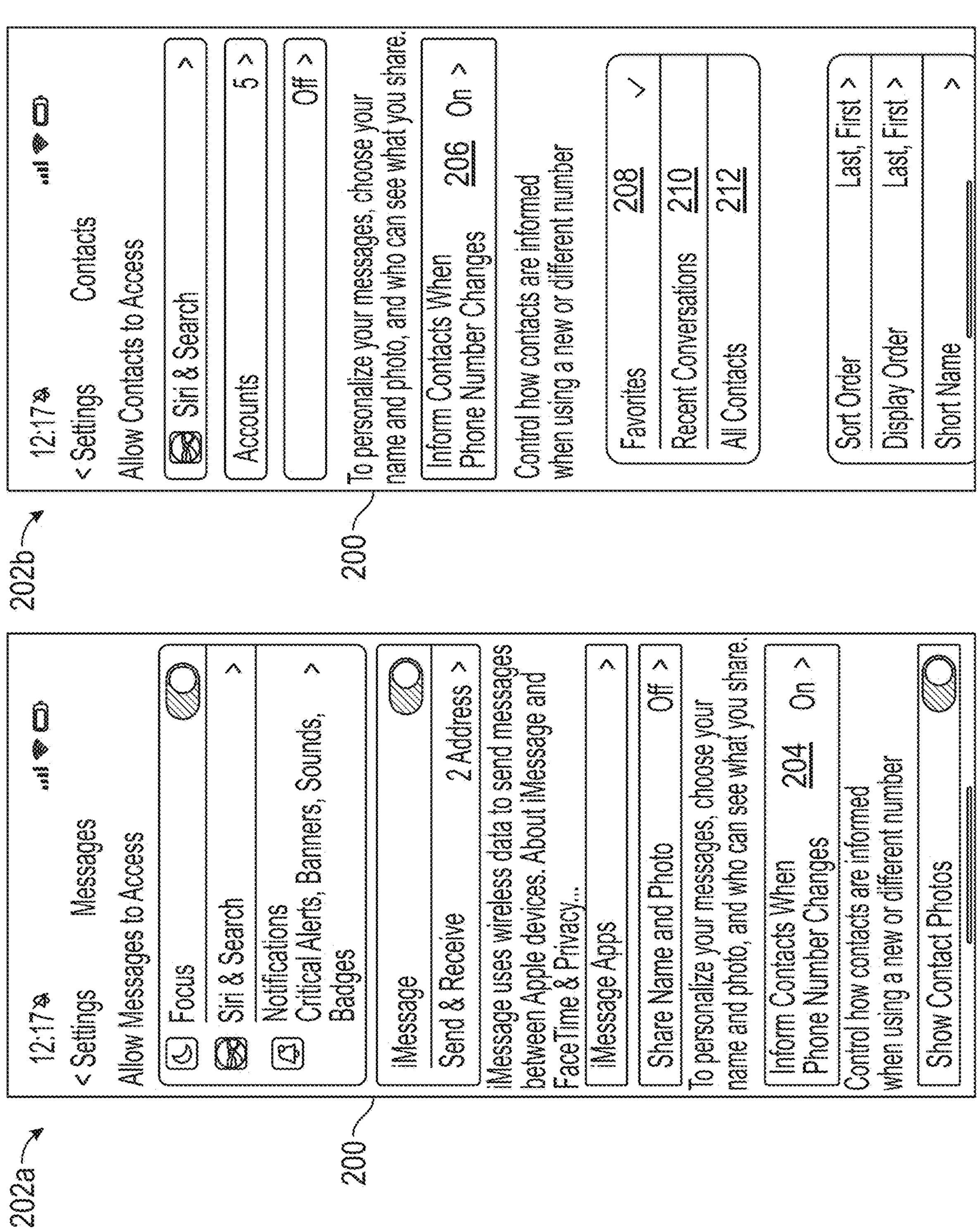
FIG. 2 depicts an example embodiment of user settings corresponding to the methods for notifying contacts of a change to the contact details of the user, in accordance with some embodiments of this disclosure.

FIG. 2 depicts an illustrative user interface for providing user settings corresponding to notifying contacts of a change to the contact details of the user, in accordance with some embodiments of this disclosure. In some embodiments, user device 200 is user device 101 of FIGS. 1A-1B or one of devices 1407, 1408, 1410 of FIG. 14. The user interfaces of FIG. 2 may be provided by system 100.

In some approaches, the OS of user device 200 creates a user-selectable setting (e.g., setting 204, setting 208, etc.) within a settings application of the OS, which is accessible via a user interface of device 200 (e.g., user interface 202*a*, and/or user interface 202*b*). As shown in FIG. 2, system 100 generates user interface 202*a* for display, comprising a representation of the OS settings associated with "Messages" on user device 200. In some embodiments, OS settings associated with "Messages" comprises setting 204 "Inform Contacts When Phone Number Changes," which is set to "On." In some implementations, setting 204 is set via a user-interface selection to "On" or "Off." In some embodiments, a user-interface selection of setting 204 provides a plurality of options to the user for controlling how contacts are informed of contact changes (e.g., an option to select a communication avenue for delivery of contact change notifications, an option to personalize preformatted message 120 of FIG. 1A, etc.). In some embodiments, a user-interface selection of setting 204 provides a plurality of options to the user for selecting which contacts are informed of contact changes. In some implementations, when setting 204 is set to "On" within the OS settings of user device 200, a detection module (e.g., the detection module of FIG. 1) is activated (e.g., begins to monitor the contact information of the user to detect a change).

As shown in FIG. 2, user interface 202*b* comprises a representation of the OS settings associated with "Contacts" on user device 200. In some implementations, OS settings associated with "Contacts" comprises setting 206 "Inform Contacts When Phone Number Changes," which is set to "On,"; setting 208, corresponding to a selection of favorited contacts; setting 210, corresponding to contacts that have recently been communicated with; and setting 212, corresponding to all contacts. In some implementations, setting 206 is set via a user-interface selection to "On" or "Off." In some embodiments, a user-interface selection of setting 206 provides a plurality of options to the user for controlling how contacts are informed of contact changes (e.g., an option to select a communication avenue for delivery of contact change notifications, an option to personalize preformatted message 120 of FIG. 1A, etc.).

In some embodiments, setting 208, setting 210, and setting 212 enable the user to select which contacts (e.g., favorites, recents, all, or any other suitable contact group, or any combination thereof) are to be notified and/or otherwise updated of any changes in the contact details of the user. In some implementations, based on receiving a user-interface selection of setting 208, user interface 102*b* of FIG. 1A is no longer generated for display by the system (e.g., system 100). In some implementations, when a change in contact details is detected, system 100 generates a user interface (e.g., user interface 102*a*) comprising a selectable option (e.g., selectable option 104) for continuing in the process of updating contacts of the user of the change in contact details. In some embodiments, upon receiving a user-interface selection of the selectable option for initiating the process for updating contacts of the change in the contact details of the user, a notification module (e.g., the notification module of FIG. 1) accesses the settings (e.g., setting 208, setting 210, etc.) to streamline the process.

For example, in some embodiments, when the user successfully adds an eSIM, system 100 generates for display on the user interface (e.g., user interface 102*a*) a selectable option for updating contacts of the change in the contact details of the user. Further, for example, upon receiving of a user-interface selection of the selectable option, system 100 generates for display a user interface (e.g., user interface 102*c*) comprising a preformatted message (e.g., preformatted message 120), an option enabling the user to specify a message to be included with the preformatted message (e.g., keyboard 122), and an indication of which contacts are to be notified (e.g., Favorites), based on the user-interface selection of setting 208. In some implementations, upon receiving of a user-interface selection of the selectable option, system 100 automatically sends a preformatted message to selected contacts based on the OS settings (e.g., setting 208 is selected, etc.). In some implementations, upon detecting a change in the contact details of the user, system 100 automatically sends a notification (e.g., preformatted message 120) to selected contacts based on the OS settings (e.g., setting 206 is set to "On," setting 208 is selected, etc.). In some implementations, upon detecting a change in the contact details of the user, system 100 automatically generates for display a user interface (e.g., user interface 102*c*) comprising a preformatted message, an option enabling the user to specify a message to be included with the preformatted message, and an indication of which contacts are to be notified (e.g., Favorites), based on the OS settings (e.g., setting 206 is set to "On," setting 208 is selected, etc.). In some embodiments, contacts are selected to be automatically notified of a change in the contact details of a user. For example, system 100 may receive input indicating that a subset of contacts (e.g., contacts on the same cellular plan or marked as "Family") are to always be notified of any change in contact details of the user.

In some implementations, the system (e.g., system 100 of FIG. 1) causes a plurality of user-selectable settings corresponding to a plurality of contact types to be generated within the OS of user device 200. In some embodiments, the plurality of user-selectable settings allows for different instructions regarding the updating of contact information to be set for different contact types. In some implementations, instructions regarding the updating of the contact information of the user for contacts categorized as a business are set by the user within the OS settings of user device 200. For example, the system may store instructions to automatically update the contact records of any contact of the user categorized as a business based on the selection of user-selectable settings within the OS settings of user device 200. Further, for example, the system may store instructions to automatically notify contacts of the user marked as "Favorite" when a change in the contact information of the user is identified and store instructions to provide the user, via a user interface (e.g., 102*a* or 102*b* of FIG. 1A), an option to select additional contacts to be notified of the change in the contact details of the user.

In some embodiments, the system is designed to handle the automatic updating of contact details when a user adds a new eSIM or changes which of their eSIMs are to be utilized. In some implementations, when a user replaces their existing eSIM with a new one, the detection module (e.g., detection module 306 of FIG. 3, detection module 406 of FIG. 4, etc.) automatically recognizes this change. In some embodiments, the user interface (e.g., 102*a* of FIG. 1A, 304 of FIG. 3, 404 of FIG. 4, etc.) proceeds to prompt the user to confirm whether they wish to update their contact details associated with the new eSIM across their network. In some implementations, upon receiving a user input confirming that the user wishes to notify and/or otherwise update their contact details across their network, the selection module (e.g., 308 of FIG. 3, 408 of FIG. 4, etc.) offers the user the option to notify all contacts or select specific contacts to be informed of the change. In some embodiments, once the selection is made, the notification module (e.g., 310 of FIG. 3, 410 of FIG. 4, etc.) sends out a preformatted message (e.g., preformatted message 120) to the chosen contacts via their preferred platform of communication (e.g., iMessage, SMS, voice calls). In some implementations, the cloud service integration module (e.g., 312 of FIG. 3, 510 of FIG. 5, etc.) simultaneously updates the user's contact details in the cloud-based accounts, ensuring that all message threads are linked to the new contact details, thereby maintaining continuity in ongoing communications. In some embodiments, when contacts are notified of the change, the change notification is sent using the best avenue (e.g., platform and/or method of electronic communication) for each contact. For example, if a contact is to be informed of a change in phone number and the contact is not an iMessage user, the update may occur via an SMS notification (for example, sending a contact card as an attachment). In another example, the notification of phone number change may be sent via email if the contact card has email as the main method of communication.

Figure 3:
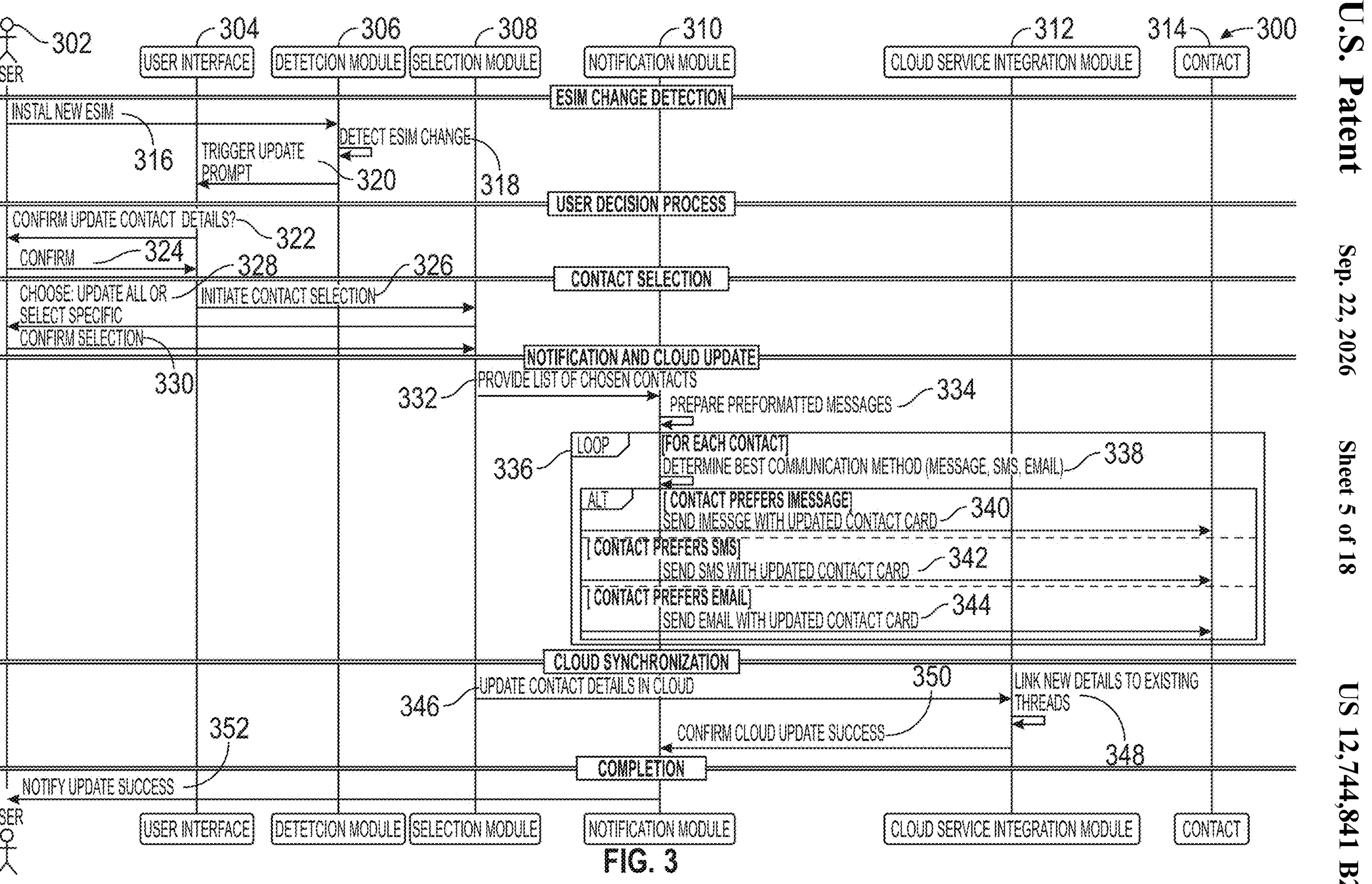
FIG. 3 is a sequence diagram of notifying a subset of contacts of a change to the contact details of a user, in accordance with some embodiments of this disclosure.

FIG. 3 depicts process 300 comprising user 302, user interface 304, detection module 306, selection module 308, notification module 310, cloud service integration module 312, and contact 314, in accordance with some embodiments of this disclosure. Process 300 may be implemented at least in part by, for example, system 100 of FIGS. 1A-1B. In some implementations, user 302 is user 103 of FIGS. 1A-1B, and user interface 304 is user interface 102*a*, 102*b*, 102*c*, 102*d*, or 102*e* of FIGS. 1A-1B. In some embodiments, at 316, user 302 installs a new eSIM, which is detected by detection module 306. In some implementations, at 318, detection module 306 detects the eSIM change. In some embodiments, at 320, detection module 306 triggers an update prompt at user interface 304. In some implementations, at 322, user interface 304 requests confirmation of an update to contact details associated with user 302. In some embodiments, at 324, user 302 confirms the update to the contact details to user interface 304. In some implementations, at 326, user interface 304 initiates contact selection with selection module 308. In some embodiments, at 328, selection module 308 provides an option to user 302 to choose to update all contacts of the change (e.g., via a notification) or to select specific contacts to be updated. In some implementations, at 330, user 302 confirms selection of which contacts to be updated of the change in contact details. In some embodiments, at 332, selection module 308 provides a list of chosen contacts to notification module 310.

In some implementations, at 334, notification module 310 prepares preformatted messages (e.g., preformatted message 120 of FIG. 1A) to be sent to the selected contacts. In some embodiments, process 300 proceeds to loop 336 where, at 338, notification module 310 determines the best communication avenue (e.g., iMessage, SMS, email) for each contact. In some implementations, at 340, for every contact that prefers iMessages, notification module 310 sends an iMessage with an updated contact card to contact 314. In some embodiments, at 342, for every contact that prefers SMS, notification module 310 sends an SMS with an updated contact card to contact 314. In some implementations, at 344, for every contact that prefers email, notification module 310 sends an email with an updated contact card to contact 314. In some embodiments, process 300 proceeds to 346, where selection module 308 updates the contact details in the cloud. In some implementations, at 348, cloud service integration module 312 links the new contact details to existing threads of communication between user 302 and contact 314. In some embodiments, at 350, cloud service integration module 312 confirms, to notification module 310, the cloud update success. In some implementations, at 352, notification module 310 notifies user 302 of the update success.

In some embodiments, the system addresses changes in connectivity preferences, such as when a user switches from using cellular data to using only Wi-Fi networks, particularly common during international travel. In some implementations, the detection module (e.g., 306 of FIG. 3, 804 of FIG. 8, etc.) identifies the disconnection from the cellular network and the connection to a Wi-Fi network. In some embodiments, the user interface (e.g., 102*a* of FIG. 1A, 304 of FIG. 3, 404 of FIG. 4, etc.) proceeds to prompt the user to decide if they want to update their preferred communication avenue to reflect this temporary change. In some implementations, if the user opts to update, they can specify the duration of this temporary change through the user interface. In some embodiments, after confirming the details, the selection module (e.g., 308 of FIG. 3, 808 of FIG. 8, etc.) allows the user to either notify and/or otherwise update all contacts or select specific ones. In some embodiments, the notification module (e.g., 310 of FIG. 3, 810 of FIG. 8, etc.) proceeds to communicate this change to the selected contacts, explaining that the user is temporarily reachable only via methods that do not require cellular connectivity, such as email or Internet-based messaging services.

Figure 4:
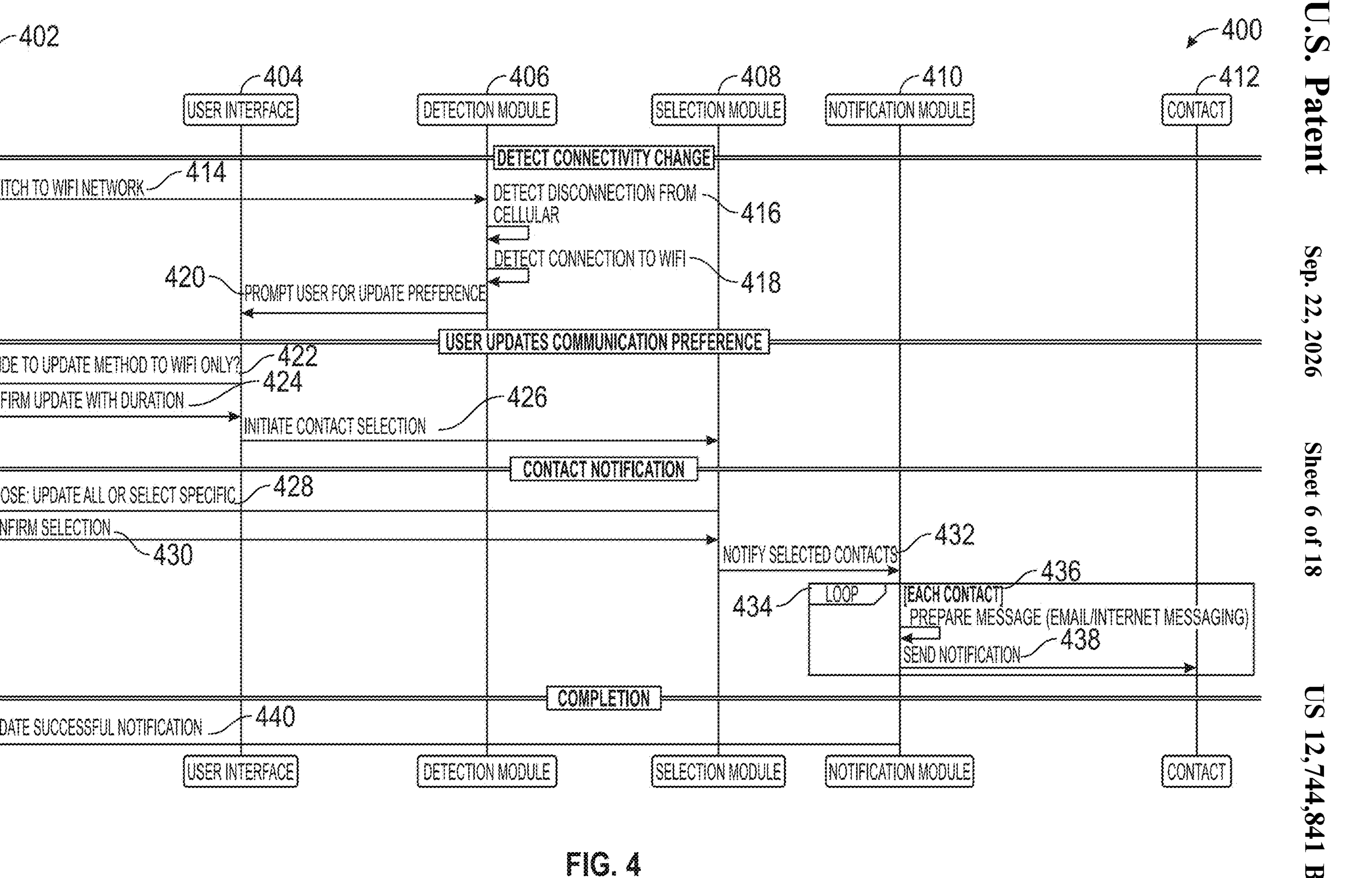
FIG. 4 is a sequence diagram of notifying a subset of contacts of a change to the contact preferences of a user, in accordance with some embodiments of this disclosure.

FIG. 4 depicts process 400 comprising user 402, user interface 404, detection module 406, selection module 408, notification module 410, and contact 412, in accordance with some embodiments of this disclosure. Process 400 may be implemented at least in part by, for example, system 100 of FIGS. 1A-1B. In some embodiments, user 402 is user 103 of FIGS. 1A-1B and user interface 404 is user interface 102*a*, 102*b*, 102*c*, 102*d*, or 102*e* of FIGS. 1A-1B. In some implementations, at 414, user 402 switches to a Wi-Fi network. In some embodiments, at 416, detection module 406 detects the disconnection from cellular by user 402, and, at 418, detection module 406 detects the connection to Wi-Fi by user 402. In some implementations, at 420, detection module 406 prompts user interface 404 to prompt user for an update preference selection. In some embodiments, at 422, user interface 404 provides user 402 an option to select to decide to update communication methods to be Wi-Fi only.

In some implementations, at 424, user 402 provides user interface 404 with confirmation that communication methods are to be updated to be Wi-Fi only and provides a duration for communication methods to be Wi-Fi only. In some embodiments, at 426, user interface 404 initiates contact selection by selection module 408. In some implementations, at 428, selection module 408 provides to user 402 a choice to notify and/or otherwise update all contacts or to select specific contacts to be updated (e.g., via a notification). In some implementations, contact 412 is each selected contact. In some embodiments, at 430, user 402 confirms a selection of which contacts are to be updated to selection module 408. In some implementations, at 432, selection module 408 provides the contacts selected to be notified to notification module 410. In some embodiments, process 400 enters loop 434 for each contact where, at 436, notification module 410 prepares a message (e.g., preformatted message 120 of FIG. 1) for updating each of contact 412 of the change in communication method preference of user 402 and, at 438, notification module 410 sends the prepared message to each of contacts 412. In some implementations, at 440, notification module 410 notifies user 402 of the successful updating of each selected contact of the change in communication method of user 402.

In some embodiments, the system facilitates the management of temporary changes in contact details. For example, if a user temporarily changes their phone number while traveling, the user interface (e.g., 102*a*, 102*b* of FIG. 1A, 304 of FIG. 3, 404 of FIG. 4, etc.) allows them to specify that this is a temporary change and set a duration for which the new number will be valid. In some implementations, the selection module (e.g., 308 of FIG. 3, 808 of FIG. 8, etc.) proceeds to prompt the user to select contacts to be notified about this temporary change. In some embodiments, the notification module (e.g., 310 of FIG. 3., 810 of FIG. 8, etc.) sends messages that include the temporary contact details and the duration of their validity to the selected contacts. In some implementations, the cloud service integration module (e.g., 312 of FIG. 3, 510 of FIG. 5, etc.) ensures that all messages received during this period are appropriately routed to the temporary number and that the user's original number is restored in all systems once the specified duration ends, seamlessly reverting all communication threads back to the original contact details.

Figure 5:
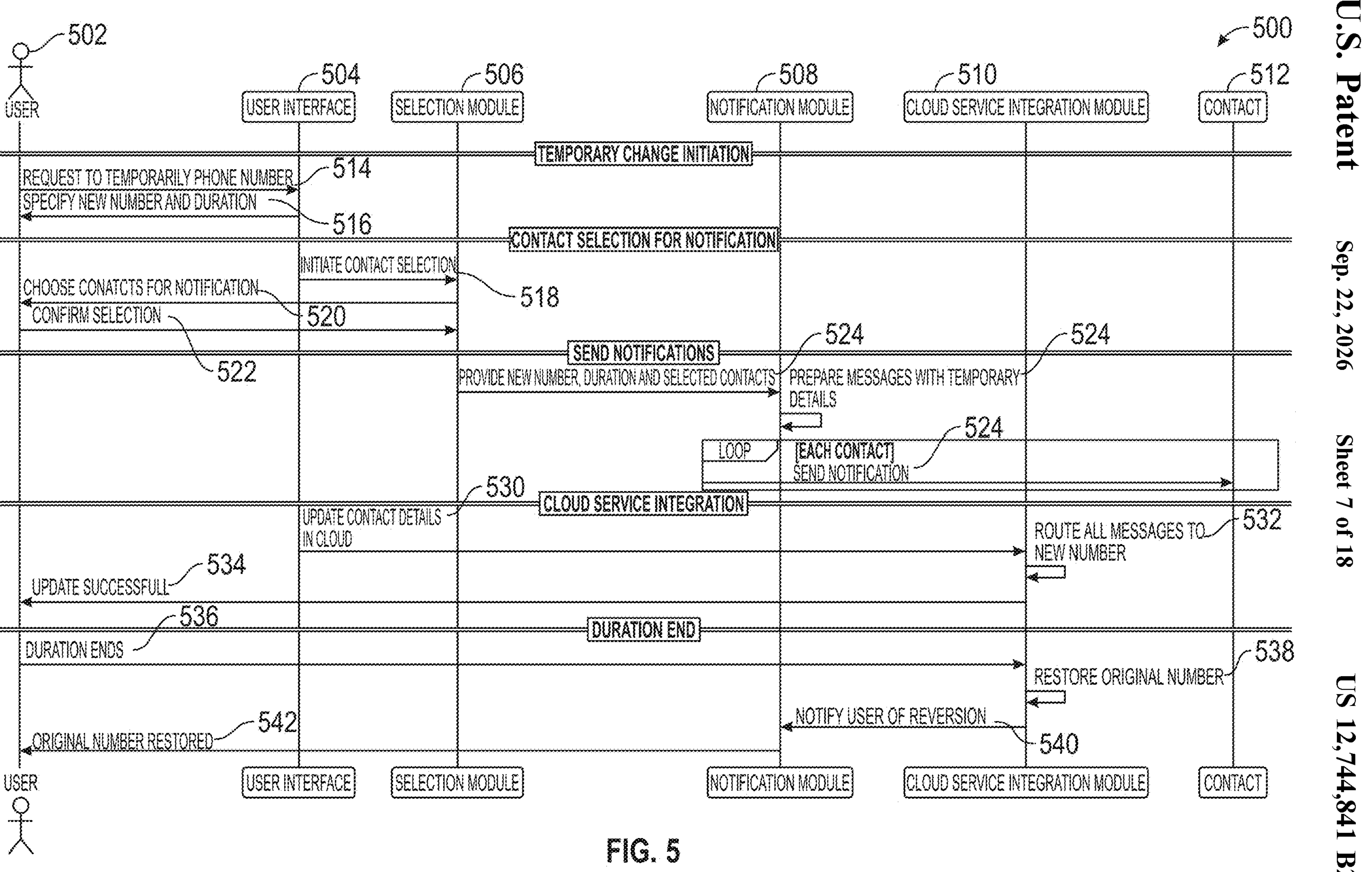
FIG. 5 is a sequence diagram of notifying a subset of contacts of a temporary change to the contact details of a user, in accordance with some embodiments of this disclosure.

FIG. 5 depicts process 500 comprising user 502, user interface 504, selection module 506, notification module 508, cloud service integration module 510, and contact 512, in accordance with some embodiments of this disclosure. Process 500 may be implemented at least in part by, for example, system 100 of FIGS. 1A-1B. In some implementations, user 502 is user 103 of FIGS. 1A-1B and user interface 504 is user interface 102*a*, 102*b*, 102*c*, 102*d*, or 102*e* of FIGS. 1A-1B. In some embodiments, at 514, user 502 requests to temporarily change their phone number to user interface 504. In some implementations, at 516, user interface 504 requests user 502 to specify the new number and the duration of the temporary change in phone number. In some embodiments, at 518, user interface 504 initiates contact selection at selection module 506. In some implementations, at 520, selection module provides user 502 a choice to select which contacts to notify of the temporary change in phone number. In some embodiments, at 522, user 502 provides a confirmation of which contacts are to be notified of the change to selection module 506. In some embodiments, contact 512 is each selected contact. In some implementations, at 524, selection module 506 provides the new number, the duration of the change, and the selected contacts to notification module 508. In some embodiments, at 526, notification module 508 prepares a message (e.g., preformatted message 120) comprising the details of the temporary change to be sent to contact 512.

In some implementations, process 500 enters loop 528 where notification module 508 notifies each contact 512 of the details of the temporary change in contact details of user 502 by sending the prepared messages. In some embodiments, at 530, user interface 504 updates the contact details of the user in the cloud. In some implementations, at 532, cloud service integration module 510 routes all messages sent to the original phone number of user 502 to the temporary phone number being used by user 502. In some embodiments, at 534, cloud service integration module provides user 502 with confirmation that the temporary update to the contact details of user 502 has been successful. In some implementations, at 536, user 502 confirms that the duration of the temporary change in the phone number has ended to cloud service integration module 510. In other embodiments, cloud service integration module automatically determines that the duration has ended based on the duration specified by user 502 at 516. In some implementations, at 538, cloud service integration module 510 restores the original phone number to the contact details of user 502 and terminates the routing of messages sent to the original phone number to the temporary phone number. In some implementations, at 540, cloud service integration module 510 provides notification module 508 with instructions to notify user 502 of the removal of the temporary contact details in the cloud. In some implementations, at 542, notification module 508 notifies user 502 that the original phone number has been restored and the temporary change in phone number is no longer active.

In some embodiments, the system includes a feature to manage attempts by one user to contact another user whose contact details have recently changed but were not updated for the contacting user due to privacy settings or selective notification preferences. In some implementations, when such an attempt occurs, the system's privacy management module (e.g., 604 of FIG. 6) checks whether the contacting user is part of the group that was allowed to receive the updated contact details. In some embodiments, if the contacting user was not part of this allowed group, the system intervenes by notifying them that the contact details for the person they are trying to reach have changed.

In some embodiments, the notification process involves the system sending a message to the contacting user, informing them that the contact details have changed, and they currently do not have access to the updated information. In some implementations, this message includes an option for the contacting user to request the updated contact information directly from the user who has changed their details. In some embodiments, the request can be facilitated through a simple interface provided by the user interface module, which sends a notification to the user whose details have changed, asking them to approve or deny the request for their new contact information.

Figure 6:
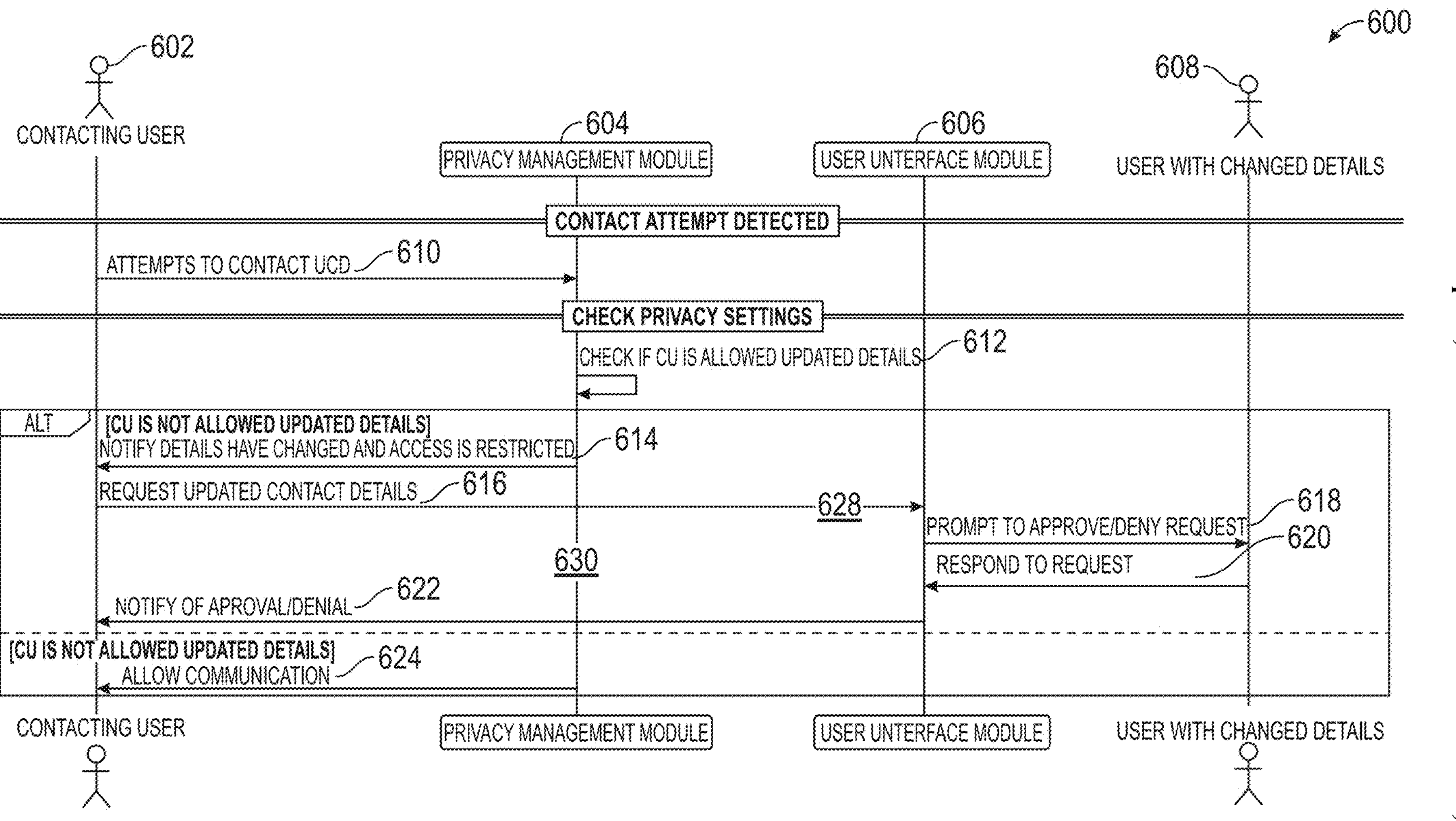
FIG. 6 is a sequence diagram of utilizing privacy settings to manage attempts by a contact to message a user whose contact details have changed, in accordance with some embodiments of this disclosure.

FIG. 6 depicts process 600 comprising contacting user (CU) 602, privacy management module 604, user interface module 606, and user with changed details (UCD) 608, in accordance with some embodiments of this disclosure. Process 600 may be implemented at least in part by, for example, system 100 of FIGS. 1A-1B. In some implementations, UCD 608 is user 103 of FIGS. 1A-1B. In some embodiments, at 610, contacting user 602 attempts to contact UCD 608, which is detected by privacy management module 604. In some implementations, at 612, privacy management module 604 checks if CU 602 is allowed access to the updated contact details of UCD 608. In some embodiments, if CU 602 is not allowed access to the updated contact details of UCD 608, privacy management module 604, at 614, notifies CU 602 that the contact details of UCD 608 has changed and that CU 602 is restricted from receiving the updated contact details. In some embodiments, privacy management module 604 provides an option to CU

602 to request the updated contact details of UCD 608. In some implementations, at 616, a request from CU 602 for the updated contact details is received at user interface module 606.

In some embodiments, at 618, user interface module 606 provides UCD 608 with an option to approve or deny the request of CU 602 to receive the updated contact details of UCD 608. In some implementations, at 620, UCD 608 provides a response to the request to approve or deny access to their updated contact details to user interface module 606. In some embodiments, if the response at 620 of UCD 608 is a denial of access, at 622, user interface module 606 notifies CU 602 that they have been denied access to the updated contact details of UCD 608. In some implementations, if the response at 620 of UCD 608 is an approval of access, at 622, user interface module 606 notifies CU 602 that they have been allowed access to the updated contact details of UCD 608 and subsequently provides the updated contact details of UCD 608. In some embodiments, if CU 602 is allowed access to the updated contact details of UCD 608, privacy management module 604, at 624, provides to CU 602 the updated contact details of UCD 608 to allow for communication.

In some embodiments, the system is configured to handle scenarios where a user receives a message at their old contact number after they have updated their contact details. In some implementations, the cloud service integration module (e.g., 312 of FIG. 3, 510 of FIG. 5, etc.) plays a crucial role here by maintaining a link between the old and new contact details. In some embodiments, when a message is received at the old number, the system detects this through the detection module (e.g., 306 of FIG. 3, 804 of FIG. 8, etc.) and triggers a query via the user interface (e.g., 102*a* of FIG. 1, 304 of FIG. 3, 404 of FIG. 4, etc.) to the recipient.

In some embodiments, the user interface (e.g., 102*a* of FIG. 1A, 304 of FIG. 3, 404 of FIG. 4, etc.) prompts the recipient to decide whether to accept the message received on the old number. In some implementations, if the recipient chooses to accept the message, the system proceeds to ask if they want to notify the sender about the change in their contact details. In some implementations, if the recipient agrees to inform the sender, the notification module (e.g., 310 of FIG. 3., 810 of FIG. 8, etc.) is activated to send a preformatted message to the sender. In some embodiments, this message informs the sender of the updated contact details and optionally advises them to update their records to ensure future communications are directed to the new number or contact method.

Figure 7:
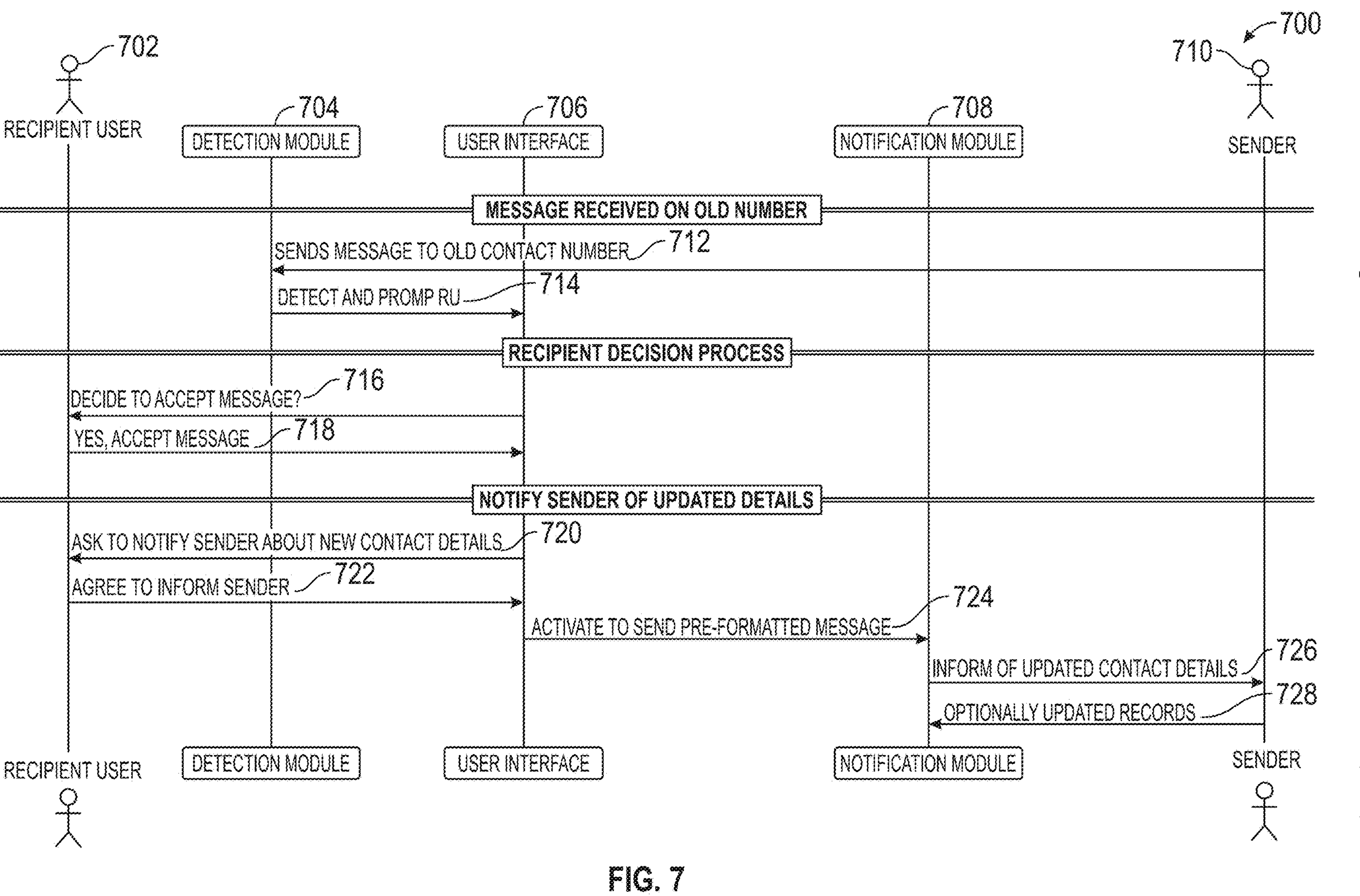
FIG. 7 is a sequence diagram of managing communications for a user whose contact details have changed, in accordance with some embodiments of this disclosure.

FIG. 7 depicts process 700 comprising recipient user (RU) 702, detection module 704, user interface 706, notification module 708, and sender 710, in accordance with some embodiments of this disclosure. Process 700 may be implemented at least in part by, for example, system 100 of FIGS. 1A-1B. In some embodiments, RU 702 is user 103 of FIGS. 1A-1B and user interface 706 is the user interface of user device 101 of FIGS. 1A-1B (e.g., user interface 102*a*, user interface 102*b*, user interface 102*c*). In some implementations, at 712, sender 710 sends a message to the old contact number of RU 702. In some embodiments, at 714, detection module 704 detects the message that has been sent to RU 702 and prompts RU 702 at user interface 706 of the attempt to be messaged by sender 710. In some implementations, at 716, user interface 706 provides RU 702 with an option to accept the message sent by sender 710. In some embodiments, RU 702 provides input to user interface 706 indicating their rejection of the message sent by sender 710, and process 700 may end. In some implementations, at 718, RU 702 provides input to user interface 706 indicating their approval to receive the message from sender 710. In some embodiments, at 720, user interface 706 provides RU 702 with an option to select to notify sender 710 of the change in the contact details of RU 702. In some implementations, at 722, RU 702 provides input to user interface 706 indicating their approval to provide sender 710 with their updated contact details. In some embodiments, at 724, user interface 706 activates notification module 708 to send a preformatted message to sender 710. In some implementations, at 726, notification module 708 informs sender 710 of the updated contact details of RU 702 by sending the preformatted message. In some embodiments, notification module 708 provides sender 710 with an option to update their records to reflect the updated contact details of RU 702. In some implementations, at 728, sender 710 provides input to notification module 708 for their records to be updated to reflect the updated contact details of RU 702.

In some embodiments, the system incorporates a recommendation feature that enhances user convenience when updating contact details, such as a change in phone number. In some implementations, the selection module (e.g., 308 of FIG. 3, 808 of FIG. 8, etc.) utilizes an algorithm to analyze the user's communication patterns and identify key contacts based on specific criteria such as the frequency of communication, designation as favorites, or active involvement in ongoing conversations. In some embodiments, upon detecting a change in the user's phone number through the detection module (e.g., 306 of FIG. 3, 804 of FIG. 8, etc.), the system triggers the user interface (e.g., 102*a* of FIG. 1A, 304 of FIG. 3, 404 of FIG. 4, etc.) to present the user with a choice to update their contact details. In some implementations, the recommendation engine within the selection module concurrently processes the user's communication history to identify and suggest a list of contacts who are most pertinent to notify about the change. In some embodiments, this list includes at least one of contacts labeled as "Favorites" in the user's phone, which often represents family members, close friends, or important colleagues; contacts with whom the user has frequent interactions, indicating a strong, ongoing relationship; or contacts currently engaged in active text message threads (ensuring that all ongoing dialogues can seamlessly continue without disruption).

Figure 8:
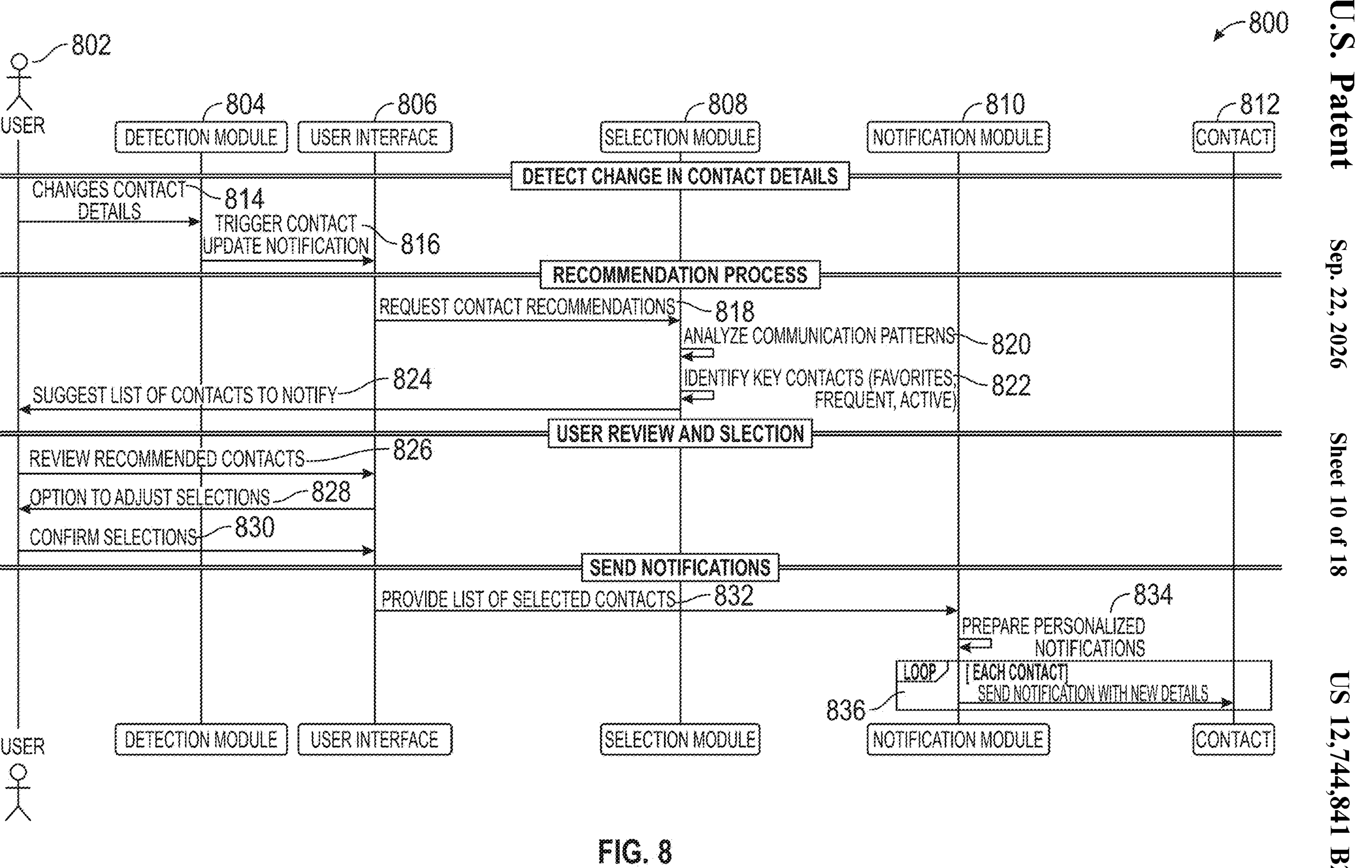
FIG. 8 is a sequence diagram of recommending a subset of contacts to be notified of a change to the contact details of a user, in accordance with some embodiments of this disclosure.

FIG. 8 depicts process 800 comprising user 802, detection module 804, user interface 806, selection module 808, notification module 810, and contact 812, in accordance with some embodiments of this disclosure. Process 300 may be implemented at least in part by, for example, system 100 of FIGS. 1A-1B. In some implementations, user 802 is user 103 of FIGS. 1A-1B, and user interface 806 is the user interface of user device 101 of FIGS. 1A-1B (e.g., user interface 102*a*, user interface 102*b*, user interface 102*c*). In some embodiments, at 814, user 802 changes their contact details (e.g., inserts an eSIM, changes phone number, changes email, or any other suitable change, or any combination thereof), which is detected by detection module 804. In some implementations, at 816, detection module 804 triggers a contact update notification to be provided to user 802 at user interface 806. In some embodiments, at 818, user interface 806 requests contact recommendations from selection module 808.

In some implementations, at 820, selection module 808 analyzes communication patterns of user 802 (e.g., frequency of communication with each contact, recency of communication with each contact, user defined categorization of each contact). In some embodiments, at 822, selection module 808 identifies key contacts of user 802 (e.g., contacts marked as a "Favorite," contacts frequently communicated with, contacts that have recently been communicated with). In some implementations, at 824, selection module 808 provides the list of contacts that have identified to user 802 as a recommendation of contacts to be notified of the updated contact details of user 802. In some embodiments, at 826, user 802 reviews the recommended contacts at user interface 806. In some implementations, at 828, user interface 806 provides selectable options to user 802 to adjust which contacts are to be notified of the change in the contact details of user 802. In some embodiments, at 830, user 802 provides confirmation of their selections at user interface 806. In some implementations, at 832, user interface 806 provides the list of user-selected contacts to notification module 810. In some embodiments, at 834, notification module 810 prepares personalized notifications to be sent to the user-selected contacts. In some implementations, process 800 proceeds to loop 836, where notification module 810 sends a notification comprising the updated contact details of user 802 to each user-selected contact.

In some embodiments, the system is equipped to automatically respond to messages sent to an outdated contact number or email address by informing the sender of the contact detail change and providing an updated contact card. In some implementations, this process is facilitated through the integration of the notification module (e.g., 310 of FIG. 3., 810 of FIG. 8, etc.) and the cloud service integration module (e.g., 312 of FIG. 3, 510 of FIG. 5, etc.). In some embodiments, when a message is received at a contact detail that has been updated (e.g., an old phone number or email address), the detection module (e.g., 306 of FIG. 3, 804 of FIG. 8, etc.) identifies this incoming communication. In some implementations, the system triggers the notification module, which is responsible for responding to the sender. In some embodiments, the response crafted by the notification module includes a notification that the user's contact details have changed. In some implementations, alongside the notification, the system attaches an updated digital contact card (e.g., vCard) that includes the user's new contact details, such as the new phone number, email address, and potentially other relevant communication information like social media handles or secondary contact numbers. In some embodiments, the updated contact card is generated by the cloud service integration module, which ensures that all the latest user contact information is accurately reflected. In some implementations, the cloud service integration module pulls the most recent contact details from the user's profile stored in the cloud (e.g., iCloud for Apple users) and packages these details into the contact card format before it is sent out.

Figure 9:
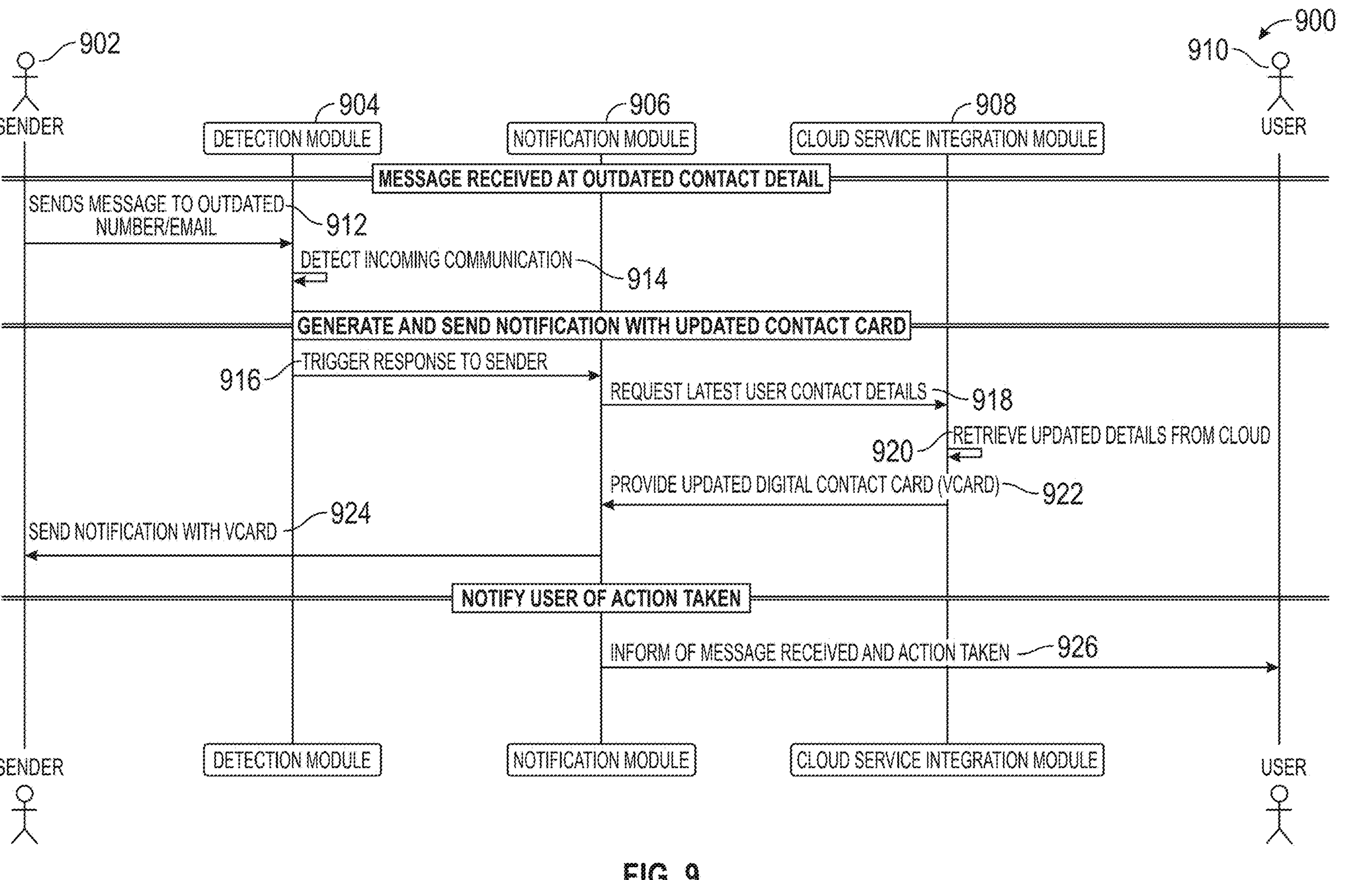
FIG. 9 is a sequence diagram of managing communications for a user whose contact details have changed, in accordance with some embodiments of this disclosure.

FIG. 9 depicts process 900 comprising sender 902, detection module 904, notification module 906, cloud service integration module 908, and user 910, in accordance with some embodiments of this disclosure. Process 900 may be implemented at least in part by, for example, system 100 of FIGS. 1A-1B. In some implementations, user 910 is user 103 of FIGS. 1A-1B. In some embodiments, at 912, sender 902 sends a message to outdated contact information (e.g., phone number, email) of user 910. In some implementations, at 914, detection module 904 detects the incoming communication from sender 902. In some embodiments, at 916, detection module 904 triggers notification module 906 to prepare a response (e.g., preformatted message 120 of FIG. 1) to sender 902. In some implementations, at 918, notification module 906 requests the latest contact details of user 910 from cloud service integration module 908. In some embodiments, at 920, cloud service integration module 908 retrieves updated contact details of user 910 from the cloud (e.g., iCloud for Apple users) and, at 922, cloud service integration module 908 provides an updated digital contact card (e.g., vCard) to notification module 906. In some embodiments, at 924, notification module 906 notifies sender 902 of the updated contact details of user 910 (e.g., by sending the updated digital contact card). In some implementations, at 926, notification module 906 informs user 910 of the receipt of the message from sender 902 and of the subsequent informing of sender 902 of the updated contact details of user 910.

In some embodiments, the system includes a feature designed to enhance the management of contact information updates by utilizing an analysis of communication history. In some implementations, the system incorporates a module specifically engineered to analyze the timestamps of the last communications within each message thread. In some embodiments, by determining the time since the last interaction, the system identifies threads that have not been updated due to the absence of an update command being received. In some implementations, once such threads are identified, the system employs a selective notification process. In some embodiments, the selective notification process is triggered when the module detects that a message thread's last communication predates the most recent update to the user's contact details. In some implementations, upon detection, the system engages a notification module (e.g., 310 of FIG. 3., 810 of FIG. 8, etc.) designed to alert only the contacts in those specific threads about the change in contact details. In some embodiments, the notification sent to these contacts includes relevant information about the updated contact details and optionally provides reasons for the change or instructions on how they can update their records to maintain communication continuity.

Figure 10:
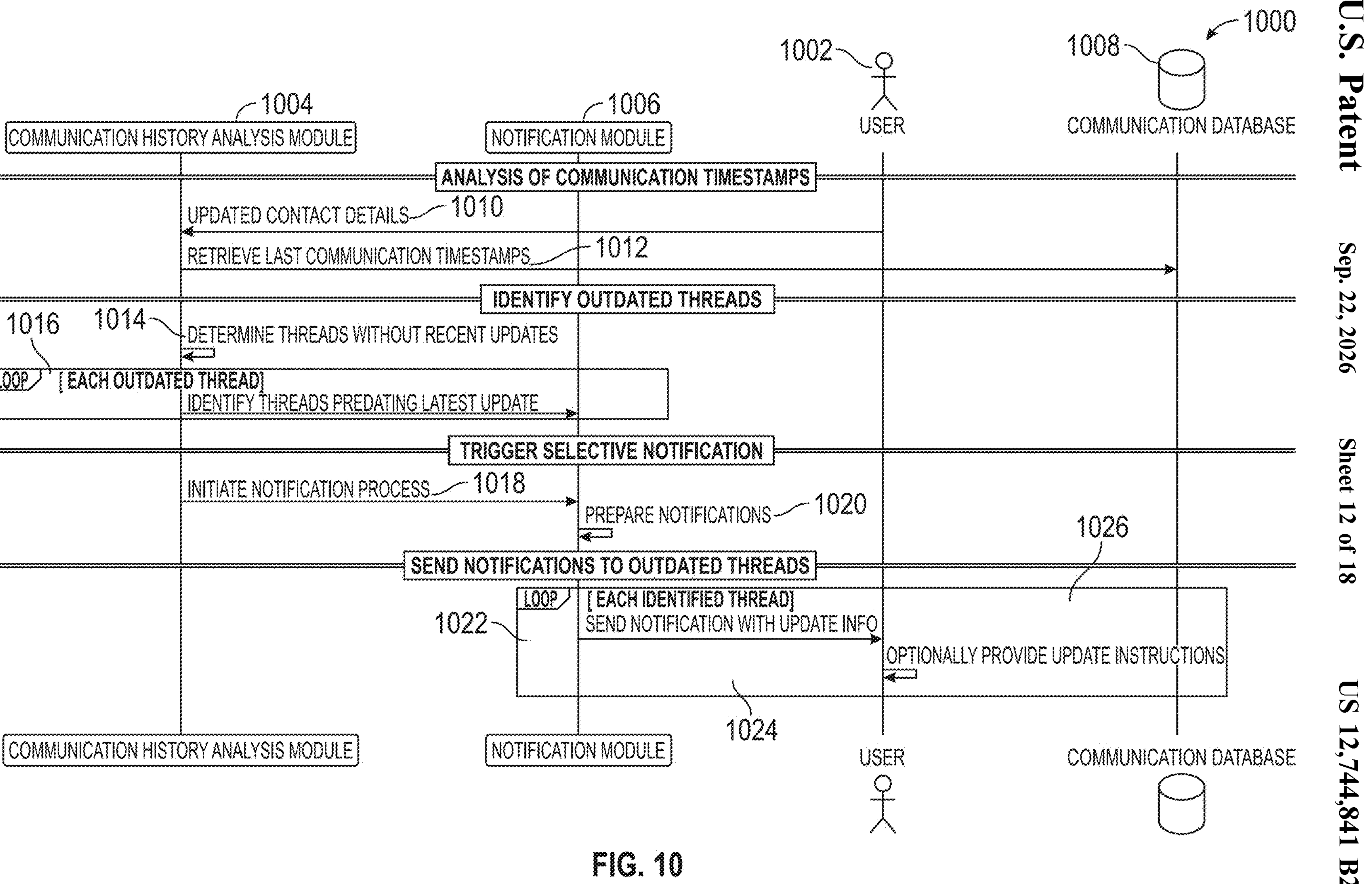
FIG. 10 is a sequence diagram of notifying a subset of contacts of a temporary change to the contact details of a user, in accordance with some embodiments of this disclosure.

FIG. 10 depicts process 1000 comprising user 1002, communication history analysis module (CHAM) 1004, notification module 1006, and communication database 1008, in accordance with some embodiments of this disclosure. Process 1000 may be implemented at least in part by, for example, system 100 of FIGS. 1A-1B. In some implementations, user 1002 is user 103 of FIGS. 1A-1B and communication database 1008 is communication database 108 of FIGS. 1A-1B. In some embodiments, at 1010, user 1002 updates their contact details, which are received by CHAM 1004. In some implementations, at 1012, CHAM 1004 retrieves the last communication timestamp of user 1002 from communication database 1008 for each communication thread of user 1002. In some embodiments, at 1014, CHAM 1004 determines which communication threads do not contain a recent update (e.g., communication threads with a last communication timestamp predating the update to the contact details of user 1002). In some implementations, at 1016, process 1000 enters loop 1016 where CHAM 1004 identifies each communication thread with a last communication timestamp predating the latest update and provides each identified communication thread to notification module 1006. In some embodiments, at 1018, CHAM 1004 initiates the notification process at notification module 1006. In some implementations, at 1020, notification module 1006 prepares each notification comprising the updated contact details of user 1002 (e.g., preformatted message 120) for delivery at each identified communication thread. In some embodiments, process 1000 enters loop 1022 where, at 1024, notification module 1006 sends the prepared notifications comprising the updated contact details of user 1002 to each identified communication thread. In some implementations, at 1026, within loop 1022, user 1002 optionally provides additional update instructions within the communication thread (e.g., how to update records to maintain communication continuity).

In some embodiments, the system, implemented by a carrier or network provider, incorporates an enhanced feature designed to manage the transition of users to a new contact detail (e.g., phone number) while maintaining seamless communication across the network. In some implementations, the enhanced feature includes a special update command that is sent to the system when a user changes a contact detail (e.g., new number). In some embodiments, the update command includes a list from the user's address book of contact details (e.g., phone number, email, or any other suitable contact detail, or any combination thereof) of the user's contacts, or a list of contact details identified from existing communications of the user. In some implementations, the system stores each identified contact detail (e.g., the contact details identified from the user's address book of contact details, the contact details identified from existing communications of the user, or any other suitable contact detail, or any combination thereof) and creates an association with the new contact detail of the user (e.g., the new phone number of the user). In some embodiments, when a message coming from a stored contact detail and destined for the old contact detail arrives, the system responds to the incoming message with an update notification, forwards the message, or initiates any other methods disclosed herein. For example, if a sender sends an SMS message that includes a number used to verify an account by multi factor authentication (MFA), the SMS message is forwarded to the new or temporary phone number. In some embodiments, the sender is notified of the change (temporary or permanent), as described in other embodiments. In some implementations, the sender adjusts their system accordingly or responds to the change in contact details as they see fit. For example, a sender using SMS for MFA responds to the notification (e.g., of a number change) by sending another SMS message to the new number with additional requirements to establish the new number for MFA.

Figure 11:
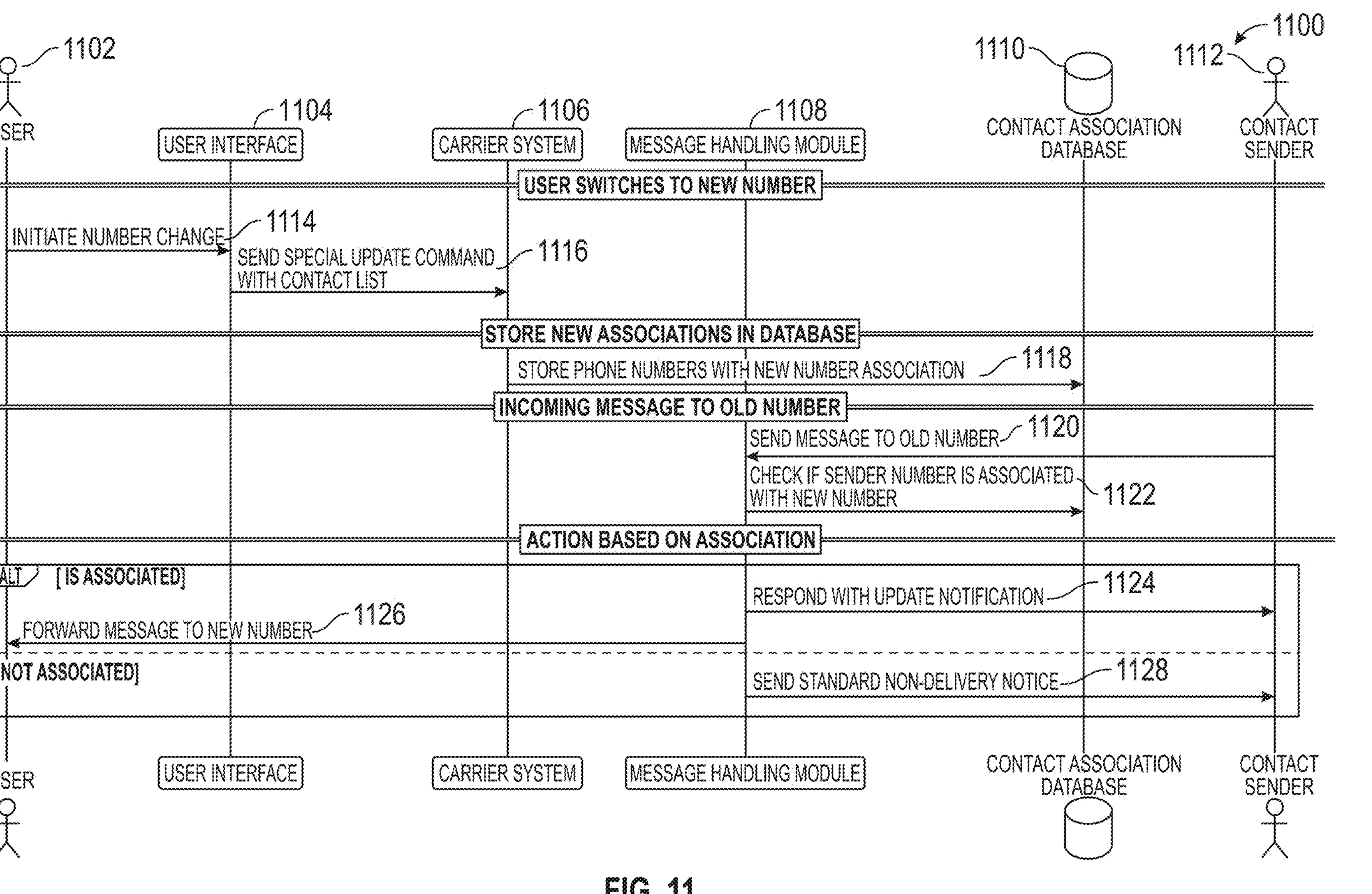
FIG. 11 is a sequence diagram of managing communications for a user whose contact details have changed, in accordance with some embodiments of this disclosure.

FIG. 11 depicts process 1100 comprising user 1102, user interface 1104, carrier system 1106, message handling module 1108, contact association database 1110, and contact sender 1112, in accordance with some embodiments of this disclosure. Process 1100 may be implemented at least in part by, for example, system 100 of FIGS. 1A-1B. In some implementations, user 1102 is user 103 of FIGS. 1A-1B, and user interface 1104 is the user interface of user device 101 of FIGS. 1A-1B (e.g., user interface 102*a*, user interface 102*b*, user interface 102*c*). In some implementations, contact association database 1110 is communication database 108 of FIGS. 1A-1B, and carrier system 1106 is a network provider, a wireless service provider, or any suitable system that provides for the transmittal of communications from a first device to a second device, or any combination thereof (e.g., AT&T™, T-Mobile™, etc.). In some embodiments, at 1114, user 1102 initiates a change in their contact details (e.g., from an old number to a new number) at user interface 1104. In some implementations, at 1116, from user interface 1104, carrier system 1106 receives a special update command and a list of the contacts of user 1102. In some embodiments, at 1118, carrier system 1106 stores the contact information of the contacts of user 1102 as having an association with the contact details (e.g., new phone number, old phone number) of user 1102 in contact association database 1110. In some implementations, at 1120, contact sender 1112 attempts to send a message specifying the old contact detail of user 1102, which is detected by message handling module 1108. In some embodiments, at 1122, message handling module 1108 checks within contact association database 1110 to determine if the contact information of contact sender 1112 is associated with the contact details of user 1102.

In some implementations, if it is determined that the contact information of contact sender 1112 is associated with the contact details of user 1102, process 1100 proceeds to 1124, where message handling module 1108 provides an update notification comprising the updated contact details of user 1102 (e.g., preformatted message 120) to contact sender 1112. In some embodiments, at 1126, message handling module 1108 forwards the message sent by contact sender 1112 to the new contact detail of user 1102. In some implementations, if it is determined that the contact information of contact sender 1112 is not associated with the contact details of user 1102, process 1100 proceeds to 1128, where message handling module 1108 sends a standard non-delivery notice to contact sender 1112 based on the old contact detail of user 1102 no longer being active. In some embodiments, if the old contact detail of user 1102 has been reassigned to a new user, the message is delivered to a device of the new user. In some implementations, message handling module 1108 provides a notification to contact sender 1112 indicating that the old contact detail has recently changed from association with user 1102 to association with a new user and requests confirmation from contact sender 1112 that the message is intended to be sent to the new user. In some embodiments, based on receiving confirmation from contact sender 1112 that the message is intended for the new user, the message is sent to the specified contact information (e.g., the old contact detail of user 1102).

In an embodiment, the system provides a mechanism that allows users to exercise enhanced control over their contact details, particularly in managing how their new contact information is shared in response to incoming messages directed at their old phone number. This feature enables users to approve updates on a case-by-case basis, thereby ensuring privacy and discretion in updating their contact information among different contacts.

Figure 12:
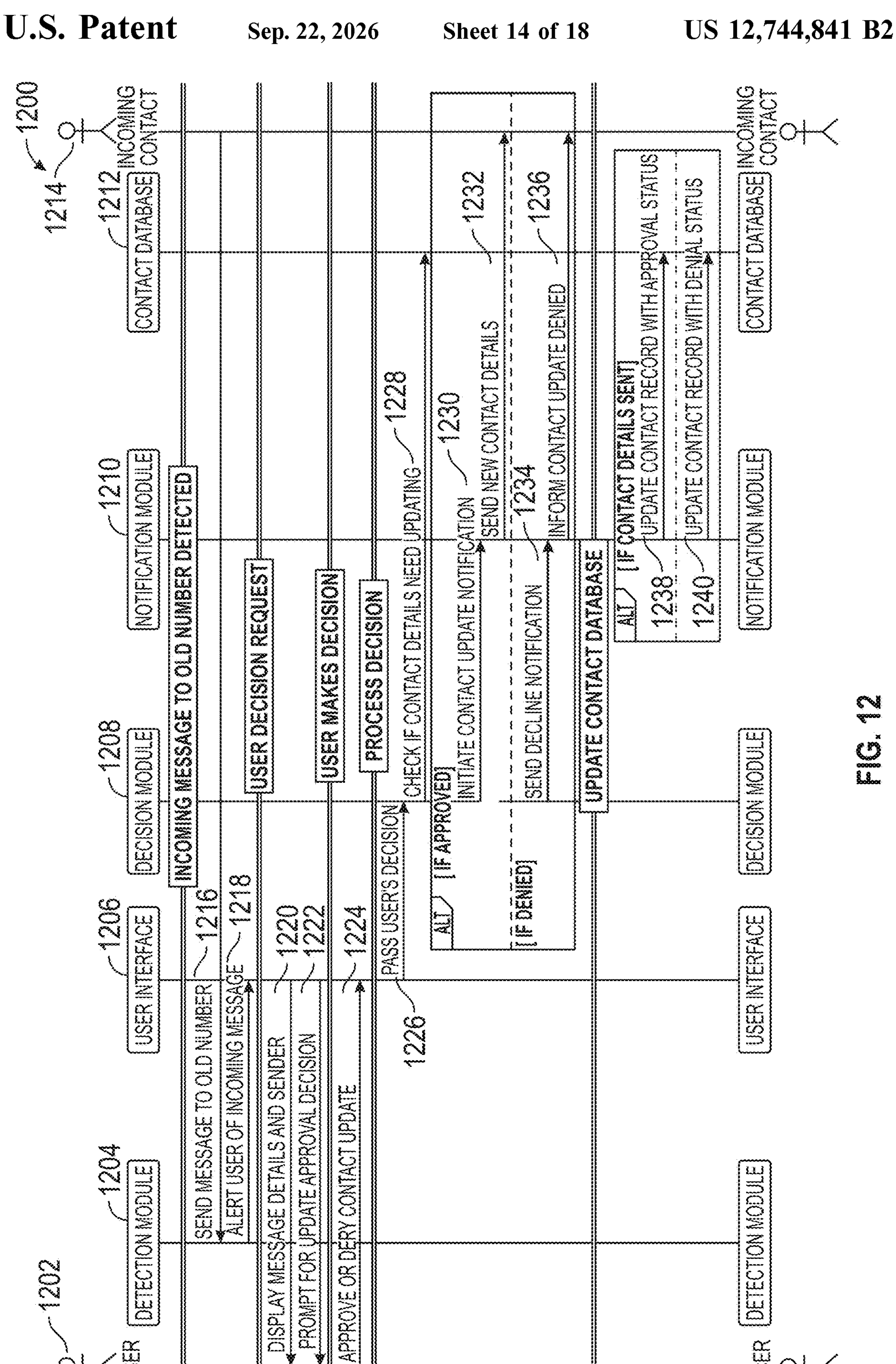
FIG. 12 is a sequence diagram of managing communications for a user whose contact details have changed, in accordance with some embodiments of this disclosure.

FIG. 12 depicts process 1200 comprising user 1202, detection module 1204, user interface 1206, decision module 1208, notification module 1210, contact database 1212, and incoming contact 1214, in accordance with some embodiments of this disclosure. Process 1200 may be implemented at least in part by, for example, system 100 of FIGS. 1A-1B. In some implementations, user 1202 is user 103 of FIGS. 1A-1B, and user interface 1206 is the user interface of user device 101 of FIGS. 1A-1B (e.g., user interface 102*a*, user interface 102*b*, user interface 102*c*). In some embodiments, contact database 1212 is communication database 108 of FIGS. 1A-1B. In some implementations, at 1216, incoming contact 1214 attempts to send a message specifying an old contact detail (e.g., phone number) of user 1202, which is detected by detection module 1204. In some embodiments, the system determines that incoming contact 1214 is associated with 1202 by any method previously disclosed. In some embodiments, at 1218, detection module 1204 alerts user 1202, via user interface 1206, of the attempt by incoming contact 1214 to message user 1202 at their old contact detail. In some implementations, at 1220, user interface 1206 displays the message sent by incoming contact 1214 and the contact details of incoming contact 1214 to user 1202. In some embodiments, at 1222, user interface 1206 provides a selectable option to user 1202 to update, or not to update, incoming contact 1214 of the change in the contact details of user 1202. In some implementations, at

1224, user 1202 provides an input via user interface 1206 indicating whether incoming contact 1214 is to be updated of the change in the contact details of user 1202. In some embodiments, at 1226, user interface 1206 provides the decision received from the user (i.e., allowing or denying an update of the contact details of user 1202 to be provided to incoming contact 1214) to decision module 1208. In some implementations, at 1228, decision module 1208 checks within contact database 1212 to determine if incoming contact 1214 requires an update comprising the change to the contact details of user 1202.

In some embodiments, if user 1202 provided approval for the system to update incoming contact 1214 of the change in the contact details of user 1202, process 1200 proceeds to 1230, where decision module 1208 initiates the contact update notification process at notification module 1210. In some implementations, at 1232, notification module 1210 provides the new contact details of user 1202 to incoming contact 1214 (e.g., sends a message containing a new contact card for user 1202). In some embodiments, if user 1202 declined for the system to update incoming contact 1214 of the change in the contact details of user 1202, process 1200 proceeds to 1234, where decision module 1208 sends the decline notification to notification module 1210. In some implementations, at 1236, notification module 1210 provides to incoming contact 1214 at least one of a notification indicating that the specified old contact detail is no longer associated with user 1202; a notification indicating that user 1202 has declined to provide incoming contact 1214 with their updated contact details; a notification indicating that user 1202 has received the message but has declined to provide their updated contact details to incoming contact 1214; or a selectable option to send the message specifying the old contact detail of user 1202 to a new user associated with the specified contact detail.

FIG. 13 shows generalized embodiments of illustrative user equipment devices 1300 and 1301. For example, user equipment device 1300 may be a smartphone device (e.g., user device 101 of FIG. 1). In another example, user equipment system 1301 may be a user television equipment system. User television equipment system 1301 may include set-top box 1316. Set-top box 1316 may be communicatively connected to microphone 1318, speaker 1314, and display 1312. In some embodiments, microphone 1318 may receive voice commands for the system. In some embodiments, display 1312 may be a television display or a computer display. In some embodiments, set-top box 1316 may be communicatively connected to user input interface 1310. In some embodiments, user input interface 1310 may be a remote control device or a touchscreen. Set-top box 1316 may include one or more circuit boards. In some embodiments, the circuit boards may include processing circuitry, control circuitry, and storage (e.g., RAM, ROM, hard disk, removable disk, etc.). In some embodiments, the circuit boards may include an input/output path. More specific implementations of user equipment devices are discussed below in connection with FIG. 13. Each one of user equipment device 1300 and user equipment system 1301 may receive content and data via input/output (I/O) path 1302. I/O path 1302 may provide content (e.g., messages, calls, broadcast programming, on-demand programming, Internet content, content available over a local area network (LAN) or wide area network (WAN), and/or other content) and data to control circuitry 1304, which includes processing circuitry 1306 and storage 1308. Storage 1308 comprises the instructions for managing a change in the contact information of a user as described in FIGS. 1-12, when executed by processing circuitry 1306. Control circuitry 1304 may be used to send and receive commands, requests, and other suitable data using I/O path 1302, which may comprise I/O circuitry. I/O path 1302 may connect control circuitry 1304 (and specifically processing circuitry 1306) to one or more communications paths (described below). I/O functions may be provided by one or more of these communications paths, but are shown as a single path in FIG. 13 to avoid overcomplicating the drawing.

Control circuitry 1304 may be based on any suitable processing circuitry such as processing circuitry 1306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1304 executes instructions stored in memory (i.e., storage 1308) for managing a change in the contact information of a user as described in FIGS. 1-12. Specifically, control circuitry 1304 may perform the functions discussed above and below. In some implementations, any action performed by control circuitry 1304 may be based on instructions received from the detection module (e.g., 306 of FIG. 3, 804 of FIG. 8, etc.), the notification module (e.g., 310 of FIG. 3., 810 of FIG. 8, etc.), the privacy management module (e.g., 604 of FIG. 6), or the cloud service integration module (e.g., 312 of FIG. 3, 510 of FIG. 5, etc.).

In client/server-based embodiments, control circuitry 1304 may include communications circuitry suitable for communicating with a server or other networks or servers. The instructions for carrying out the above-mentioned functionality may be stored on a server (which is described in more detail in connection with FIG. 14). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 14). In addition, communications circuitry may include circuitry that enables peer-to-peer communication of user equipment devices, communication between a user and a contact of the user, or communication of user equipment devices in locations remote from each other (described in more detail below).

Memory may be an electronic storage device provided as storage 1308 that is part of control circuitry 1304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1308 may be used to store various types of content described herein as well as detection module (e.g., 306 of FIG. 3, 804 of FIG. 8, etc.), notification module (e.g., 310 of FIG. 3., 810 of FIG. 8, etc.), privacy management module (e.g., 604 of FIG. 6), cloud service integration module (e.g., 312 of FIG. 3, 510 of FIG. 5, etc.), and the communication database as data described above. Nonvolatile memory may also be used (e.g., to launch a boot-up routine and other instructions). Cloud-based storage, described in relation to FIG. 14, may be used to supplement storage 1308 or instead of storage 1308.

Control circuitry 1304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1304 may also include scaler circuitry for upconverting and downconverting content into the preferred output format of user equipment 1300. Circuitry 1304 may also include digital-to-analog converter circuitry and analog-to-digital converter circuitry for converting between digital and analog signals. The tuning and encoding circuitry may be used by user equipment device 1300, 1301 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1308 is provided as a separate device from user equipment device 1300, the tuning and encoding circuitry (including multiple tuners) may be associated with storage 1308.

A user may send instructions to control circuitry 1304 using user input interface 1310. User input interface 1310 may be any suitable user interface, such as a remote control, mouse, trackball, keypad, keyboard, touch screen, touchpad, stylus input, joystick, voice recognition interface, or other user input interfaces. Display 1312 may be provided as a stand-alone device or integrated with other elements of each one of user equipment device 1300 and user equipment system 1301. For example, display 1312 may be a touchscreen or touch-sensitive display. In such circumstances, user input interface 1310 may be integrated with or combined with display 1312. Display 1312 may be one or more of a monitor, a television, a display for a mobile device, or any other type of display. A video card or graphics card may generate the output to display 1312. The video card may be any processing circuitry described above in relation to control circuitry 1304. The video card may be integrated with the control circuitry 1304. Speakers 1314 may be provided as integrated with other elements of each one of user equipment device 1300 and user equipment system 1301 or may be stand-alone units. The audio component of videos and other content displayed on display 1312 may be played through the speakers 1314. In some embodiments, the audio may be distributed to a receiver (not shown), which processes and outputs the audio via speakers 1314.

The system for managing the change in the contact information of a user as described in FIGS. 1-12 may be implemented using any suitable architecture. For example, it may be a stand-alone system wholly-implemented on each one of user equipment device 1300 and user equipment system 1301. In such an approach, instructions of the system are stored locally (e.g., in storage 1308), and data for use by the system is downloaded on a periodic basis (e.g., from an out-of-band feed, from an Internet resource, or using another suitable approach). Control circuitry 1304 may retrieve instructions for the system from storage 1308 and process the instructions to perform the management of a change in the contact information of a user. Based on the processed instructions, control circuitry 1304 may determine what action to perform when input is received from user input interface 1310. For example, movement of a cursor on a display up/down may be indicated by the processed instructions when user input interface 1310 indicates that an up/down button was selected.

In some embodiments, the system is a client/server-based application. Data for use by a thick or thin client implemented on each one of user equipment device 1300 and user equipment system 1301 is retrieved on-demand by issuing requests to a server remote to each one of user equipment device 1300 and user equipment system 1301. In one example of a client/server-based guidance application, control circuitry 1304 runs a web browser that interprets web pages provided by a remote server. For example, the remote server may store the instructions for the application in a storage device. The remote server may process the stored instructions using circuitry (e.g., control circuitry 1304) to perform the operations discussed in connection with FIGS. 1-12 and 15-16.

In some embodiments, the system for managing the change in the contact information of a user may be downloaded and interpreted or otherwise run by an interpreter or virtual machine (run by control circuitry 1304). In some embodiments, the system for managing the change in the contact information of a user may be encoded in the ETV Binary Interchange Format (EBIF), received by the control circuitry 1304 as part of a suitable feed, and interpreted by a user agent running on control circuitry 1304. For example, the system for managing the change in the contact information of a user may be an EBIF application. In some embodiments, the system for managing the change in the contact information of a user may be defined by a series of JAVA-based files that are received and run by a local virtual machine or other suitable middleware executed by control circuitry 1304. In some of such embodiments (e.g., those employing MPEG-2 or other digital media encoding schemes), the system for managing the change in the contact information of a user may be, for example, encoded and transmitted in an MPEG-2 object carousel with the MPEG audio and video packets of a program.

FIG. 14 shows illustrative devices and systems for managing the change in the contact information of a user, in accordance with some embodiments of this disclosure. User equipment devices 1407, 1408, 1410 (e.g., user device 101) may be coupled to communication network 1406. Communication network 1406 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 1406) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 14 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 1406.

System 1400 includes a media content source 1402 and a server 1404, which may comprise or be associated with database 1405. Communications with media content source 1402 and server 1404 may be exchanged over one or more communications paths but are shown as a single path in FIG. 14 to avoid overcomplicating the drawing. In addition, there may be more than one of each of media content source 1402 and server 1404, but only one of each is shown in FIG. 14 to avoid overcomplicating the drawing. If desired, media content source 1402 and server 1404 may be integrated as one source device.

In some embodiments, server 1404 may include control circuitry 1411 and a storage 1414 (e.g., RAM, ROM, Hard Disk, Removable Disk, etc.). Server 1404 may also include an input/output path 1412. I/O path 1412 may provide device information, or other data, over a local area network (LAN) or wide area network (WAN), and/or other content and data to the control circuitry 1411, which includes processing circuitry, and storage 1414. The control circuitry 1411 may be used to send and receive commands, requests, and other suitable data using I/O path 1412, which may comprise I/O circuitry. I/O path 1412 may connect control circuitry 1411 (and specifically processing circuitry) to one or more communications paths.

Control circuitry 1411 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1411 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 1411 executes instructions for an emulation system application stored in memory (e.g., the storage 1414). Memory may be an electronic storage device provided as storage 1414 that is part of control circuitry 1411.

Server 1404 may retrieve guidance data from media content source 1402, process the data as will be described in detail below, and forward the data to user equipment devices 1407, 1408 and 1410. Media content source 1402 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 1402 may be the originator of content (e.g., a television broadcaster, a Webcast provider, etc.) or may not be the originator of content (e.g., an on-demand content provider, an Internet provider of content of broadcast programs for downloading, etc.). Media content source 1402 may include cable sources, satellite providers, on-demand providers, Internet providers, over-the-top content providers, or other providers of content. Media content source 1402 may also include a remote media server used to store different types of content (including video content selected by a user), in a location remote from any of the client devices. Media content source 1402 may also provide metadata that can be used to identify important segments of media content as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 1404), which may be located centrally or at distributed locations, that provide cloud-based services to various types of users and devices connected via a network such as the Internet via communication network 1406. In such embodiments, user equipment devices may operate in a peer-to-peer manner without communicating with a central server.

Figure 15:
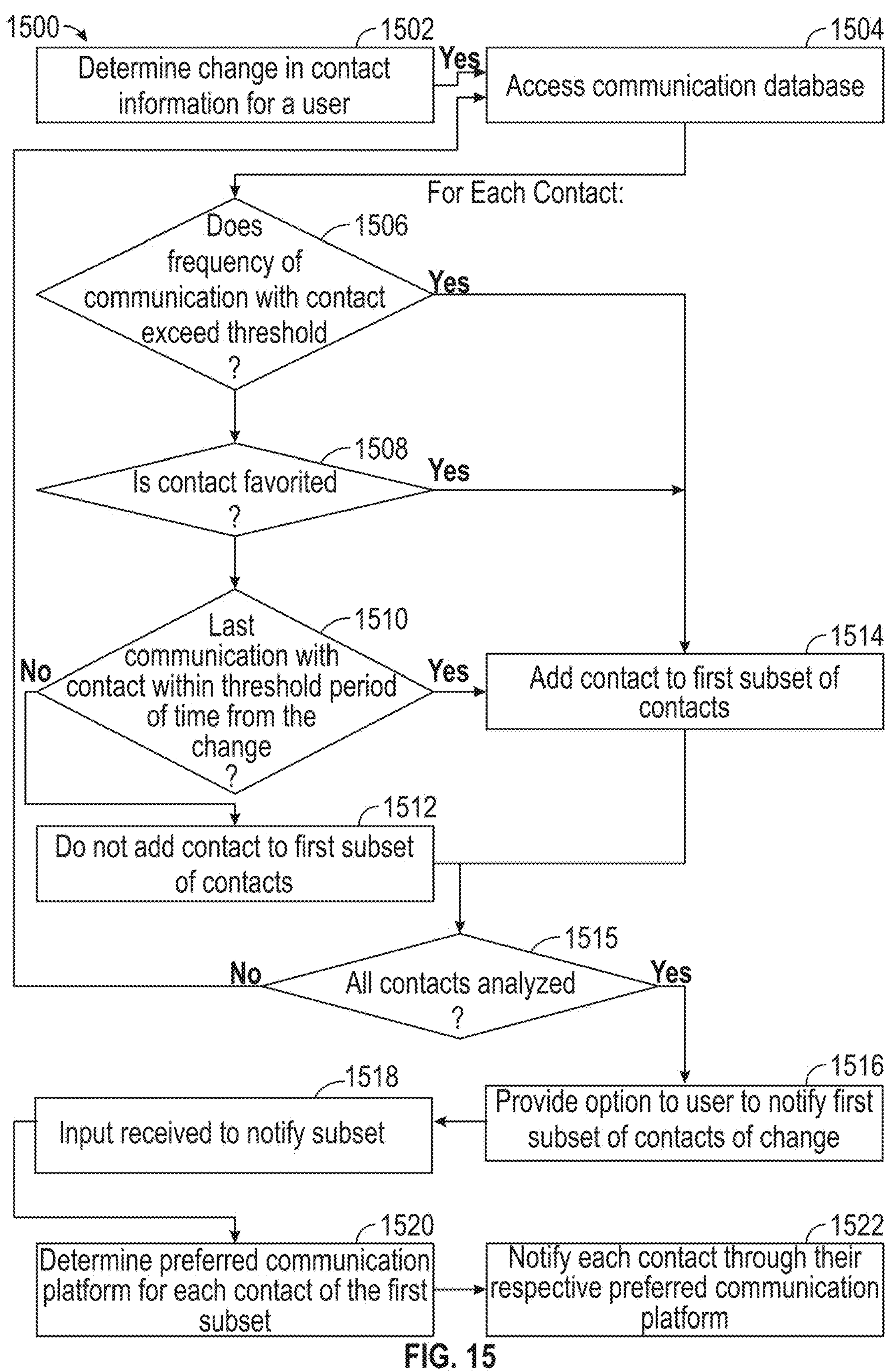
FIG. 15 is flowchart of a detailed illustrative process for managing communications for a user whose contact details have changed, in accordance with some embodiments of this disclosure.

FIG. 15 is flowchart of detailed illustrative process 1500 for updating contacts of a user (e.g., user 103) that the contact details of the user have changed, in accordance with some embodiments of this disclosure. Process 1500 may be implemented at least in part by, for example, control circuitry 1304 of FIG. 13 and/or control circuitry 1411 of FIG. 14. In various embodiments, the individual steps of process 1500 may be implemented by one or more components of the devices and applications of FIGS. 1-14 and 16. Although the present disclosure may describe certain steps of process 1500 (and of other processes described herein) as being implemented by certain components of the devices and applications of FIGS. 1-14 and 16, this is for purposes of illustration only, and it should be understood that other components of the devices and systems of FIGS. 1-14 and 16 may implement those steps instead. In addition, one or more steps of process 1500 may be incorporated into or combined with one or more steps of any other process or embodiment.

Process 1500 begins at 1502, where the control circuitry (e.g., control circuitry 1304 of FIG. 13 and/or control circuitry 1411 of FIG. 14), by a detection module (e.g., 306 of FIG. 3, 804 of FIG. 8, etc.), determines if there has been a change in contact information of a user (e.g., user 103 of FIGS. 1A-1B, 802 of FIG. 8, etc.). In response to determining, at 1502, that there has been a change in the contact information of the user, process 1500 proceeds to 1504, where the control circuitry accesses a communication database (e.g., 108 of FIGS. 1A-1B, 1008 of FIG. 10).

From 1504, process 1500 proceeds to 1506, 1508, and/or 1510, where, for each contact of the user (e.g., user 103 of FIG. 1), the control circuitry simultaneously determines: if the frequency of communication between the user and a contact exceeds a threshold; if a contact is favorited; and/or if the last communication between the user and a contact was within a threshold period of time from the time of the change in contact information. If, at 1506, the control circuitry determines that the frequency of communication between the user and a contact exceeds a threshold (e.g., 1506=Yes), process 1500 proceeds to 1514, where the control circuitry adds the contact to a first subset. If, at 1508, the control circuitry determines that a contact is favorited (e.g., 1508=Yes), process 1500 proceeds to 1514, where the control circuitry adds the contact to a first subset. If, at 1510, the control circuitry determines that the last communication between the user and a contact is within a threshold period of time from the time of the change in contact information (e.g., 1510=Yes), process 1500 proceeds to 1514, where the control circuitry adds the contact to a first subset. If, at each of 1506, 1508, and 1510, the control circuitry determines that the frequency of communication does not exceed the threshold, the contact is not favorited, and that the last communication between the user and a contact is not within a threshold period of time from the time of the change in contact information, process 1500 proceeds to 1512, where the contact is not added to the first subset of contacts.

From 1512 and 1514, process 1500 proceeds to 1515, where the control circuitry determines if all contacts of the user have been analyzed. If any of the contacts of the user have not been analyzed (e.g., 1515=No), process 1500 returns to 1504. If all of the contacts of the user have been analyzed (e.g., 1515=Yes), process 1500 proceeds to 1516. At 1516, the control circuitry provides an option to the user (e.g., user 103 of FIG. 1) to notify the first subset of contacts of the change in contact information of the user. The control circuitry provides the option to the user via a user interface (e.g., **102*a* of FIG. 1A, 304 of FIG. 3, etc.). The control circuitry, at 1518, determines if input (e.g., a user-interface selection of selectable option 104 of FIG. 1) was received to notify the first subset of contacts of the change. If, at 1518, the control circuitry determines that input was not received to notify the subset of contacts of the change, process 1500 ends. If, at 1518, the control circuitry determines that input was received to notify the subset of contacts of the change, process 1500 proceeds to 1520, where the control circuitry determines a preferred communication platform (e.g., iMessage, WhatsApp, Snapchat, Facebook Messenger) for each contact of the first subset. In some embodiments, if all of the contacts of the user have been analyzed (e.g., 1515=Yes), process 1500 proceeds to 1520, i.e., the control circuitry determines the preferred communication platform for each contact of the first subset without receiving user confirmation. Subsequent to determining the preferred communication platform for each contact of the first subset, process 1500 proceeds to 1522 where the control circuitry (e.g., by notification module 310 of FIG. 3, 708 of FIG. 7, etc.) notifies each contact of the change in contact information of the user via the preferred communication platform of each contact. In some embodiments, if all of the contacts of the user have been analyzed (e.g., 1515=Yes), the control circuitry proceeds to 1522**, i.e., the control circuitry notifies each contact of the first subset of the change in the contact information of the user without receiving user input.

Figure 16:
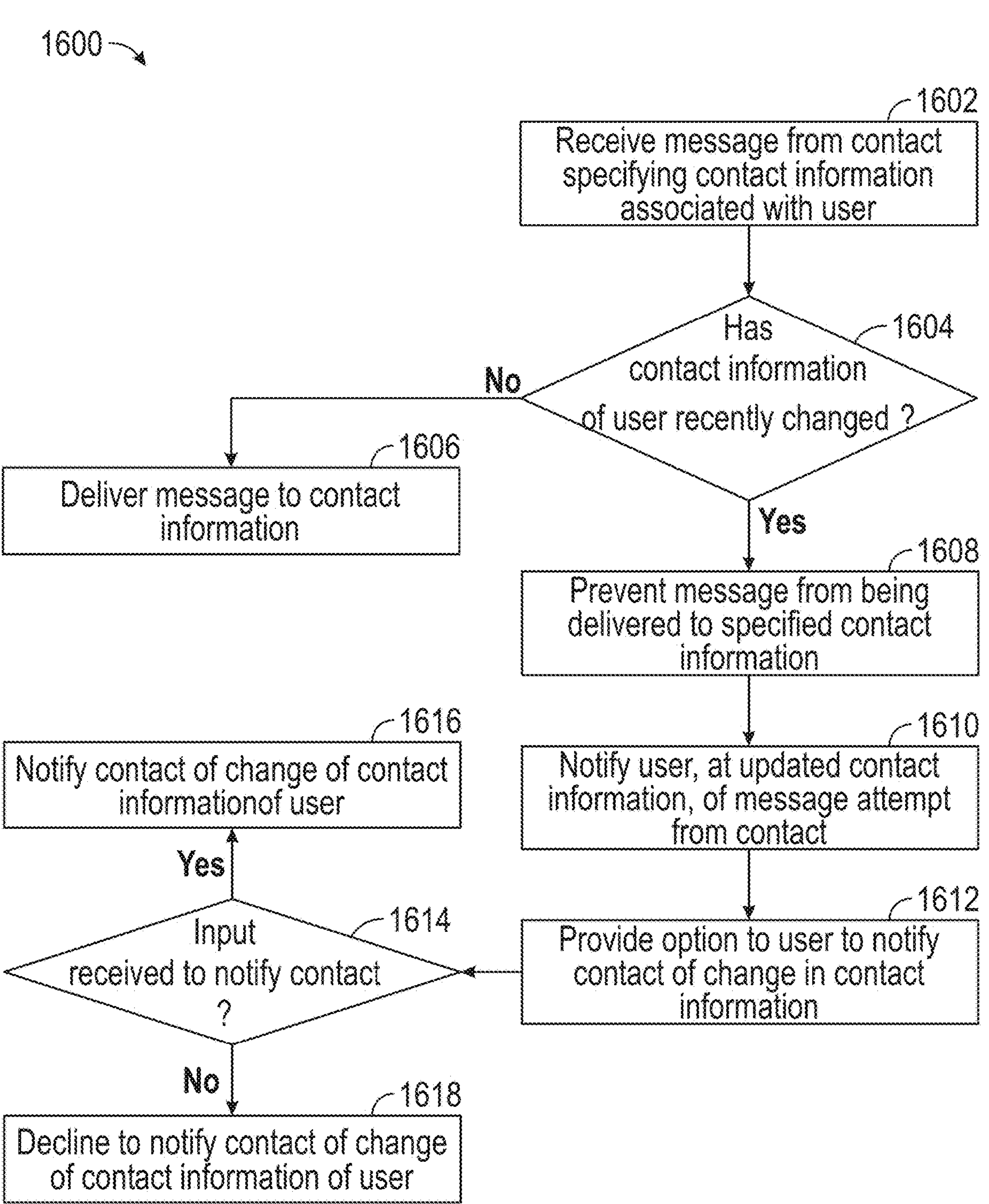
FIG. 16 is flowchart of a detailed illustrative process for managing communications for a user whose contact details have changed, in accordance with some embodiments of the disclosure.

FIG. 16 is flowchart of detailed illustrative process 1600 for managing communications for a user whose contact details have changed, in accordance with some embodiments of the disclosure. Process 1600 may be implemented at least in part by, for example, control circuitry 1304 of FIG. 13 and/or control circuitry 1411 of FIG. 14. In various embodiments, the individual steps of process 1600 may be implemented by one or more components of the devices and applications of FIGS. 1-15. Although the present disclosure may describe certain steps of process 1600 (and of other processes described herein) as being implemented by certain components of the devices and applications of FIGS. 1-15, this is for purposes of illustration only, and it should be understood that other components of the devices and systems of FIGS. 1-15 may implement those steps instead. In addition, one or more steps of process 1600 may be incorporated into or combined with one or more steps of any other process or embodiment.

Process 1600 begins at 1602, where the control circuitry (e.g., control circuitry 1304 of FIG. 13 and/or control circuitry 1411 of FIG. 14) receives a message, from a contact associated with a user (e.g., incoming contact 1214 of FIG. 12, contact sender 1112 of FIG. 11, etc.), that is specifying contact information associated with the user (e.g., user 103 of FIGS. 1A-1B, 802 of FIG. 8, etc.) as the recipient. In some implementations, the contact is identified as a contact of the user based on the control circuitry accessing a communication database (e.g., communication database 108 of FIGS. 1A-1B) that comprises data corresponding to a connection between contact information of the contact and contact information of the user such as a text message exchange between the respective phone numbers of the user and the contact, an email exchange between the respective emails of the user and the contact, a connection between the user and the contact on social media (e.g., an Instagram™ account of the contact follows an Instagram account of the user), or any other suitable data, or any combination thereof.

Upon receiving the message, process 1600 proceeds to 1604, where the control circuitry determines if the contact information of the user has recently (e.g., within a year) changed (e.g., the contact information is no longer assigned to assigned user, new contact information has recently been assigned to the user, the user has indicated a preference to be contacted at new contact information). The control circuitry may determine if any change in user association with the contact information has occurred within a period of time (e.g., six months) from when the message was sent. For example, if Charles (e.g., user 103 of FIGS. 1A-1B) changed his number from 818-818-8181 to 747-747-7474 two months ago, and a text is sent to the number 818-818-8181, the control circuitry determines that the number 818-818-8181 is no longer assigned to Charles (e.g., contact information of a user recently changed). In some embodiments, the control circuitry determines that the contact information of the user recently changed based on contact information stored in a communication database (e.g., communication database 108 of FIGS. 1A-1B). In some implementations, the control circuitry determines that the contact information of the user recently changed by a cloud service integration module (e.g., 312 of FIG. 3) that maintains a link between old and new contact details of the user. In some embodiments, the control circuitry determines that the contact information of the user recently changed by accessing the contact details of the user in cloud-based accounts (e.g., emails, direct messaging services, social media apps, messaging apps, or any other suitable account, or any combination thereof) that have been updated by the cloud service integration module. In some implementations, the control circuitry determines that the contact information of the user recently changed by accessing a contact information history of the user as stored in cloud-based accounts and identifying that an update occurred within a threshold period of time.

If the control circuitry determines that there has been no recent change in the contact information of the user (e.g., 1604=No), process 1600 proceeds to 1606, where the control circuitry delivers the message to the specified contact information. If the control circuitry determines that there has been a recent change in the contact information of the user (e.g., 1604=Yes), process 1600 proceeds to 1608, where the message is prevented from being delivered to the specified contact information. For example, if a present message is received from the number 616-616-6161 specifying the number 818-818-8181 (i.e., a number that was assigned to Charles up until two months ago) as the recipient, and a communication database accessed by the control circuitry comprises a timestamp of a previous message sent from 616-616-6161 to 818-818-8181 corresponding to three months ago, the control circuitry will prevent the message from being delivered to 818-818-8181.

At 1610, the control circuitry notifies the user whose association with the contact information has recently changed (e.g., user 103 of FIG. 1), at the updated contact information of the user, of the attempt, by the contact, to message the user. In some implementations, the notification of the message attempt from the contact includes an indication of the message sent by the contact. The control circuitry may notify the user via a user interface (e.g., 504 of FIG. 5, 706 of FIG. 7, etc.) of a user device (e.g., 101 of FIGS. 1A-1B, 200 of FIG. 2). At 1612, the control circuitry provides an option to the user to notify the contact of their change in contact information. The control circuitry may provide the option to the user via a user interface of a user device associated with the updated contact information of the user. At 1614, the control circuitry determines if input has been received to notify the contact. If, at 1614, the control circuitry determines that input was received to notify the contact of the change (e.g., 1614=Yes), process 1600 proceeds to 1616, where the control circuitry (e.g., by notification module 310 of FIG. 3, 708 of FIG. 7, etc.) notifies the contact of the change in contact information of the user. In some embodiments, the notification of the change in contact information of the user includes an updated contact card of the user. In some implementations, process 1600 simultaneously proceeds from 1608 to both 1610 and 1616 (i.e., notifies the user, at the updated contact information of the message attempt from the contact and notifies the contact of the change in the contact information of the user. If, at 1616, the control circuitry determines that input was not received to notify the contact of the change (e.g., 1614=No), process 1600 proceeds to 1618, where the control circuitry declines to notify the contact of the change in the contact information of the user.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

determining, for a user associated with a plurality of contacts, a change from first contact information to second contact information;

identifying, based at least in part on a communication history of the user, a subset of the plurality of contacts;

providing, to a device of the user, an option to notify the subset of the plurality of contacts of the change from the first contact information to the second contact information; and based on input received from the user, transmitting a notification to the subset of the plurality of contacts of the change from the first contact information to the second contact information.

2. The method of claim 1, wherein the subset is a first subset, the method further comprising:

identifying, based at least in part on the communication history of the user, a second subset of the plurality of contacts; and based on the communication history for the second subset, refraining from notifying the second subset of the change from the first contact information to the second contact information.

3. The method of claim 1, wherein the change from the first contact information to the second contact information occurs at a first time, and the communication history of the user comprises a plurality of timestamps corresponding to a plurality of communications between the plurality of contacts and the user, and the subset of the plurality of contacts is identified as one or more contacts having timestamps of the plurality of timestamps that indicate a last communication with the user within a threshold amount of time from the first time.

4. The method of claim 1, wherein the communication history of the user comprises a plurality of frequency scores corresponding to a frequency of interaction between the user and each contact of the plurality of contacts, and the subset of the plurality of contacts is identified as one or more contacts having a respective frequency score that is above a threshold value.

5. The method of claim 1, wherein the change from the first contact information to the second contact information is a temporary change and wherein transmitting the notification to the subset of the plurality of contacts of the change from the first contact information to the second contact information includes a notice indicative of the temporary change.

6. The method claim 1, wherein determining the change from the first contact information to the second contact information comprises detecting that an electronic subscriber identity module (eSIM), not previously installed at the device of the user, is being used in association with the device of the user, and the option to notify the subset of the plurality of contacts is provided based on detecting the eSIM is being used in association with the device of the user.

7. The method of claim 1, wherein providing the option to notify the subset of the plurality of contacts of the change from the first contact information to the second contact information further comprises providing an option to enable the user to specify a message to be included with the notification of the change from the first contact information to the second contact information.

8. The method of claim 1, further comprising:

receiving, from a particular contact of the plurality of contacts, a message specifying the first contact information and intended for the user, wherein the particular contact is not a part of the notified subset of the plurality of contacts;

preventing the message from being delivered to a device associated with the first contact information; and providing an indication to the device of the user associated with the second contact information and no longer associated with the first contact information, of an attempt by the particular contact to message the user using the first contact information.

9. The method of claim 8, wherein the indication comprises an option to notify the particular contact of the change from the first contact information to the second contact information.

10. The method of claim 1, further comprising:

organizing the plurality of contacts into a plurality of subsets of contacts based at least in part on the communication history of the user;

wherein providing the option to the user comprises providing, to the user, selectable user interface elements to select one or more of the plurality of subsets of contacts to be notified of the change from the first contact information to the second contact information; and wherein transmitting the notification to the subset of the plurality of contacts comprises notifying the contacts of the selected subsets of contacts of the change from the first contact information to the second contact information.

11. The method of claim 1, further comprising:

identifying a plurality of message threads associated with the first contact information, wherein the plurality of message threads comprise messages exchanged with the subset of the plurality of contacts while the device was associated with the first contact information; and linking the identified plurality of message threads from the first contact information to the second contact information, to enable the device of the user, associated with the second contact information, to provide for display the messages received prior to the change from the first contact information to the second contact information.

12. The method of claim 1, further comprising:

identifying a preferred communication platform for each contact of the plurality of contacts; and wherein notifying the subset of the plurality of contacts comprises notifying each contact of the subset of the plurality of contacts through their respective preferred communication platform.

13. A system comprising:

control circuitry configured to:

determine, for a user associated with a plurality of contacts, a change from first contact information to second contact information; and identify, based at least in part on a communication history of the user, a subset of the plurality of contacts; and input/output (I/O) circuitry configured to:

provide, to a device of the user, an option to notify the subset of the plurality of contacts of the change from the first contact information to the second contact information; and based on input received from the user, transmit a notification to the subset of the plurality of contacts of the change from the first contact information to the second contact information.

14. The system of claim 13, wherein:

the subset is a first subset;

the control circuitry is further configured to identify, based at least in part on the communication history of the user, a second subset of the plurality of contacts; and the I/O circuitry is further configured to refrain from notifying the second subset of the change from the first contact information to the second contact information based on the communication history for the second subset.

15. The system of claim 13, wherein the change from the first contact information to the second contact information occurs at a first time, and the communication history of the user comprises a plurality of timestamps corresponding to a plurality of communications between the plurality of contacts and the user, and the subset of the plurality of contacts is identified as one or more contacts having timestamps of the plurality of timestamps that indicate a last communication with the user within a threshold amount of time from the first time.

16. The system of claim 13, wherein the communication history of the user comprises a plurality of frequency scores corresponding to a frequency of interaction between the user and each contact of the plurality of contacts, and the subset of the plurality of contacts is identified as one or more contacts having a respective frequency score that is above a threshold value.

17. The system of claim 13, wherein the change from the first contact information to the second contact information is a temporary change and the notification to the subset of the plurality of contacts of the change from the first contact information to the second contact information includes a notice indicative of the temporary change.

18. The system of claim 13, wherein the control circuitry is configured to determine the change from the first contact information to the second contact information by detecting that an electronic subscriber identity module (eSIM), not previously installed at the device of the user, is being used in association with the device of the user, and the option to notify the subset of the plurality of contacts is provided based on detecting the eSIM is being used in association with the device of the user.

19. The system of claim 13, wherein the control circuitry is further configured to provide the option to notify the subset of the plurality of contacts of the change from the first contact information to the second contact information by providing an option to enable the user to specify a message to be included with the notification of the change from the first contact information to the second contact information.

20. The system of claim 13, wherein the control circuitry is further configured to:

receive, from a particular contact of the plurality of contacts, a message specifying the first contact information and intended for the user, wherein the particular contact is not a part of the notified subset of the plurality of contacts;

prevent the message from being delivered to a device associated with the first contact information; and provide an indication to the device of the user associated with the second contact information and no longer associated with the first contact information, of an attempt by the particular contact to message the user using the first contact information.

* * * * *